(12) United States Patent
Clark

(10) Patent No.: US 11,613,182 B2
(45) Date of Patent: Mar. 28, 2023

(54) BATTERY RETENTION DEVICE

(71) Applicant: Hyster-Yale Group, Inc., Fairview, OR (US)

(72) Inventor: Martin Clark, Kilmarnock (GB)

(73) Assignee: Hyster-Yale Group, Inc., Fairview, OR (US)

( * ) Notice: Subject to any disclaimer, the term of this patent is extended or adjusted under 35 U.S.C. 154(b) by 518 days.

(21) Appl. No.: 16/773,675

(22) Filed: Jan. 27, 2020

(65) Prior Publication Data

US 2021/0229559 A1 Jul. 29, 2021

(51) Int. Cl.
*H01M 50/20* (2021.01)
*B60L 50/60* (2019.01)
*B60K 1/04* (2019.01)
*B60S 5/06* (2019.01)

(52) U.S. Cl.
CPC ............. *B60L 50/66* (2019.02); *B60K 1/04* (2013.01); *B60S 5/06* (2013.01); *H01M 50/20* (2021.01); *B60K 2001/0422* (2013.01); *B60L 2200/42* (2013.01); *H01M 2220/20* (2013.01)

(58) Field of Classification Search
CPC ... H01M 50/20; H01M 2220/20; B60L 50/66; B60L 2200/42; B60K 1/04; B60K 2001/0422; B60S 5/06
See application file for complete search history.

(56) References Cited

U.S. PATENT DOCUMENTS

| | | | |
|---|---|---|---|
| 1,911,401 A | 5/1933 | Scott | |
| 2,031,508 A | 2/1936 | Scott | |
| 3,704,761 A | 12/1972 | Barrett, Jr. | |
| 4,192,397 A | 3/1980 | Stroud | |
| 4,991,674 A | 2/1991 | Fullenkamp | |
| 5,228,531 A | 7/1993 | Patterson et al. | |
| 6,000,099 A | 12/1999 | Bruckner et al. | |

(Continued)

FOREIGN PATENT DOCUMENTS

| DE | 10346550 A1 | 5/2005 |
|---|---|---|
| DE | 202011100837 U1 | 8/2011 |

(Continued)

OTHER PUBLICATIONS

DIN 43536 (Jun. 2012).
European Search Report, EPO Patent Appl. No. 20166108.9-1017 (dated Oct. 7, 2020).

*Primary Examiner* — Jane J Rhee
(74) *Attorney, Agent, or Firm* — Laurence & Phillips IP Law

(57) ABSTRACT

A battery-retention system employs a retention jaw assembly and a battery-retention mechanism to secure a battery within a battery compartment of a material-handling vehicle. The retention jaw includes a battery-contact portion operatively associated with a barrier portion that is movable between a battery-retention position when the battery contacts the battery-contact portion and a battery-release position when the battery does not contact the battery-contact portion. The battery-retention mechanism includes a stopper block that is operable to be positioned within the battery compartment when the battery compartment door is in a closed position and operable to be positioned external to the battery compartment when the battery compartment door is in an open position.

34 Claims, 20 Drawing Sheets

(56) References Cited

U.S. PATENT DOCUMENTS

| | | |
|---|---|---|
| 6,973,987 B2 | 12/2005 | Damon |
| 7,070,225 B2 | 7/2006 | Herrmann |
| 7,413,045 B2 | 8/2008 | Tien |
| 2005/0092536 A1 | 5/2005 | Takeda |
| 2005/0121241 A1 | 6/2005 | Shorney et al. |
| 2010/0300784 A1* | 12/2010 | Bergmeier .......... B66F 9/07536 180/68.5 |
| 2018/0029496 A1 | 2/2018 | Hall et al. |

FOREIGN PATENT DOCUMENTS

| | | |
|---|---|---|
| FR | 2749574 A1 | 12/1997 |
| JP | 62153294 U | 9/1987 |
| JP | 2013216137 A | 10/2013 |
| WO | 2009068304 A1 | 6/2009 |

* cited by examiner

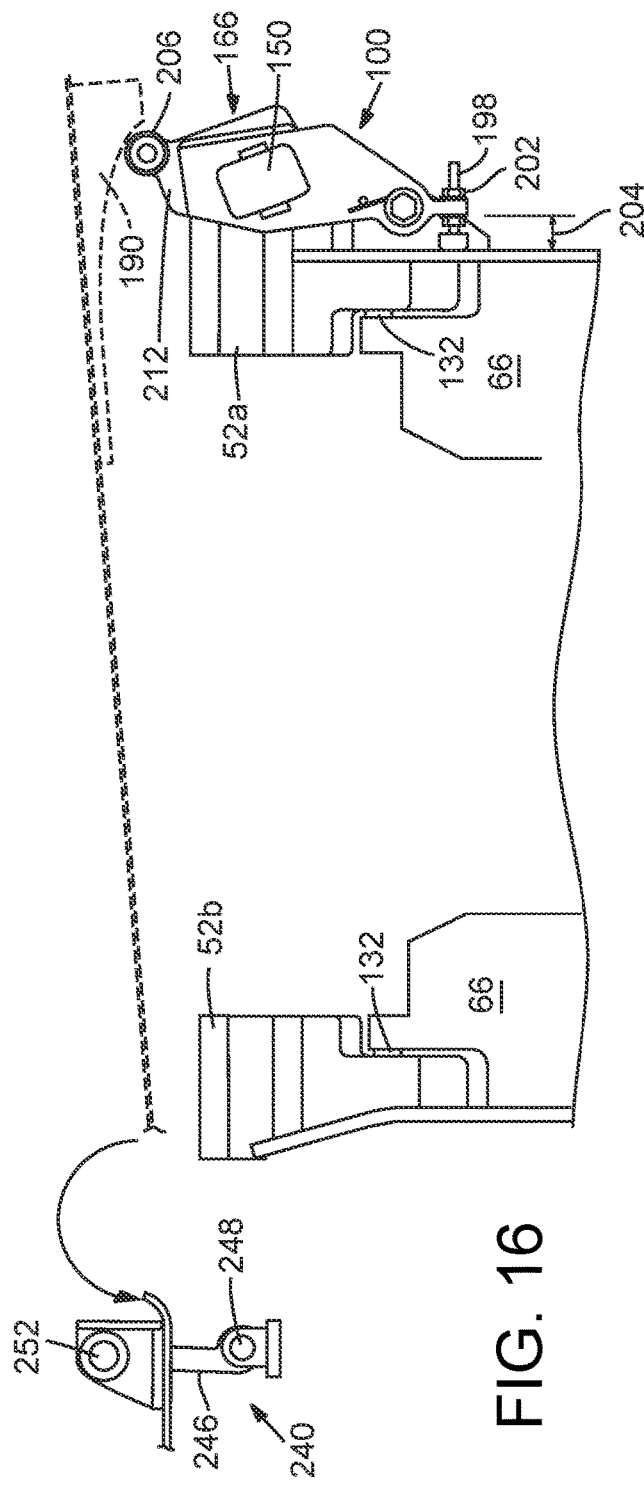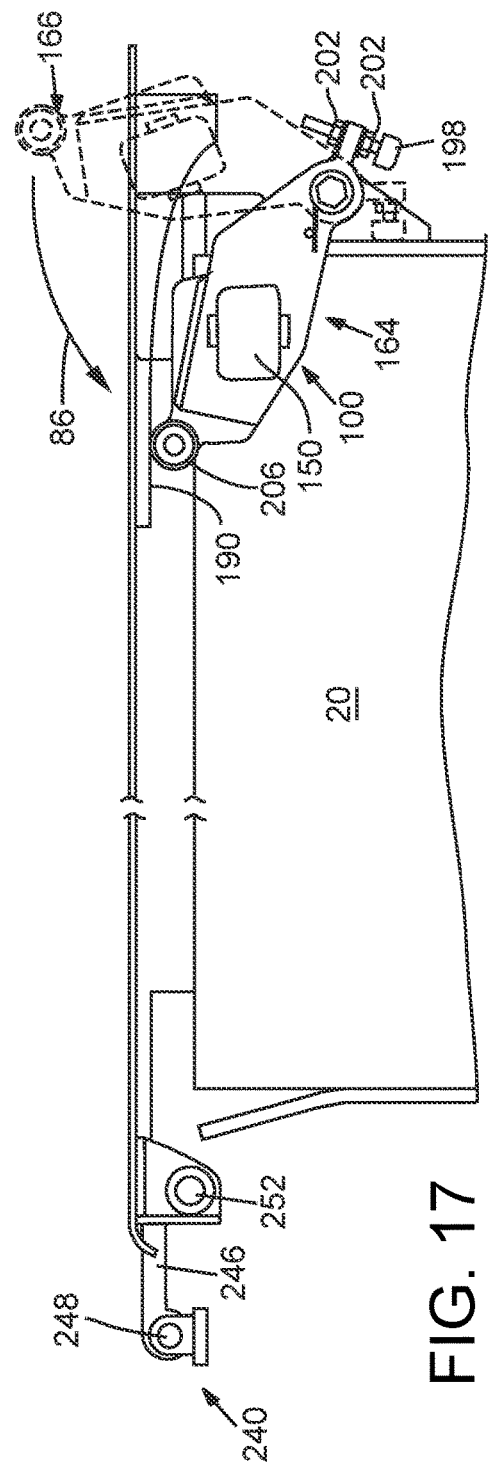

BATTERY RETENTION DEVICE

TECHNICAL FIELD

The field of this disclosure relates generally to battery-retention systems and, in particular, to retention systems for batteries that power material-handling vehicles, such as lift trucks.

BACKGROUND INFORMATION

Material-handling vehicles, such as lift trucks, may employ batteries to power lifting mechanism(s) and/or drive motor(s). The battery is extremely heavy and is generally located in a compartment under the seat in the cab of the material-handling vehicle. The floor of the seat acts as an upwardly opening battery door to the battery compartment and acts as a retention mechanism in the event of the material-handling vehicle tipping over, such as during an accident. Replacement of the battery from this type of compartment typically requires a hoist or crane to lift the old battery through a large battery opening in the roof in the cab. This arrangement limits design options for material-handling vehicles and makes battery replacement difficult and time-consuming, requiring assistance from the operator of the material-handling vehicle.

In contradistinction, German patent publication DE 103 46 550 discloses a forklift having a battery compartment accessible through a strong side-opening battery door for keeping the battery in the compartment in the event of an accident, including a tip over of the forklift, without any other further means for securing the battery. The door is configured so that its weight is always above the hinge supported on the frame of the forklift.

OVERVIEW OF DISCLOSURE

One aspect of this disclosure relates to means for retaining a battery within a battery compartment of a vehicle.

Another aspect of this disclosure relates to means for readily replacing a heavy vehicle battery.

In some embodiments, a battery compartment includes a plurality of side walls, an upper structure, and a bottom structure configured to receive a battery, wherein a battery receptacle spans between the side walls, the bottom structure, and the upper structure, and wherein the battery receptacle includes a battery opening sized to allow a battery to pass through the battery opening. A system for retaining a battery in such a battery compartment of a material-handling vehicle comprises: a retention jaw positioned in proximity to the battery opening, wherein the retention jaw includes a battery-contact portion operatively associated with a barrier portion, wherein the barrier portion is movable between a battery-retention position and a battery-release position, wherein the barrier portion is at the battery-retention position when a battery contacts the battery-contact portion, and wherein the barrier portion is at the battery-release position when a battery does not contact the battery-contact portion; a battery compartment door operable to provide an open position in which the battery opening is unobstructed and operable to provide a closed position in which the battery opening is obstructed; and a battery-retention mechanism operatively associated with the battery compartment door, the battery-retention mechanism comprising a stopper block that is operable to be positioned within the battery compartment when the battery compartment door is in the closed position and operable to be positioned at least substantially external to the battery compartment and provide substantially unobstructed access to the battery compartment when the battery compartment door is in the open position.

In some additional, alternative, or selectively cumulative embodiments, a battery compartment includes a plurality of side walls, an upper structure and a bottom structure configured to receive a battery, wherein a battery receptacle spans between the side walls, the upper structure and the bottom structure, and wherein the battery receptacle includes a battery opening sized to allow a battery to pass through the battery opening. A retention jaw for limiting movement of a battery within such a battery compartment of a material-handling vehicle comprises: a jaw pivotal-connection mechanism in proximity to the battery opening; an end barrier having a topmost lip; a jaw shaft connected to the end barrier and having a shaft distal end and a shaft proximal end, wherein the end barrier is closer to the shaft proximal end than it is to the shaft distal end; a shaft pivot point associated with the jaw shaft and positioned between the end barrier and the shaft distal end; a barrier portion that extends from the end barrier to the shaft pivot point wherein the barrier portion has a barrier-portion weight; and a shaft portion that extends from the shaft distal end to the shaft pivot point, wherein the shaft portion has a shaft-portion weight, and wherein the barrier-portion weight is greater than the shaft-portion weight such that the retention jaw is operable to rest in a receiving position with the topmost lip being at a lip level at or below a shaft level at the distal end of the jaw shaft and with the distal end of the jaw shaft being above the bottom structure.

In some additional, alternative, or selectively cumulative embodiments, a battery compartment includes a plurality of side walls, an upper structure, and a bottom structure configured to receive a battery, wherein a battery receptacle spans between the side walls, the bottom structure, and the upper structure, wherein the battery receptacle includes a battery opening sized to allow a battery to pass through the battery opening, and wherein the battery compartment is operatively associated with a battery compartment door operable to provide an open position in which the battery opening is unobstructed and operable to provide a closed position in which the battery opening is obstructed. A battery-retention mechanism for limiting movement of a battery within such a battery compartment of a material-handling vehicle comprises: a stopper block, wherein the stopper block is operable to be positioned within the battery compartment at a stopper block height that is closer to the upper structure than to the bottom structure when the battery compartment door is in the closed position and operable to be positioned external to the battery compartment and to provide substantially unobstructed access to the battery compartment when the battery compartment door is in the open position, wherein the stopper block is connected to the battery compartment door or the battery compartment, and wherein the stopper block is operable to limit movement of the battery in a direction toward the upper structure; and a stopper block hinge that is operable for rotation of the stopper block into the battery compartment as the battery compartment door achieves the closed position, and wherein the stopper block hinge is operable for rotation of the stopper block out of the battery compartment when the battery compartment door is in the open position.

In some additional, alternative, or selectively cumulative embodiments, a method for removing a battery from a material-handling vehicle comprises: opening a battery compartment door to an open position, wherein the battery has a battery weight, a battery height from a battery base to a battery top, a battery width between side walls, and a battery depth between a battery front and a battery back, wherein the material-handling vehicle has a battery compartment operatively attached to the battery compartment door, wherein the battery compartment includes a plurality of side walls, an upper structure, and a bottom structure configured to receive a battery, wherein a battery receptacle spans between the side walls, the bottom structure, and the upper structure, and wherein the battery receptacle includes a battery opening sized to allow a battery to pass through the battery opening, wherein the battery compartment is operatively associated with a battery compartment door operable to provide an open position in which the battery opening is unobstructed and operable to provide a closed position in which the battery opening is obstructed, wherein the battery compartment has a compartment height between the bottom structure and the upper structure, wherein the battery compartment has a compartment width between the first and second side retainers, wherein opening the battery compartment door to the open position causes a battery-retention mechanism comprising a stopper block to move the stopper block from a stopper block height within the battery compartment to a position that is at least substantially external to the battery compartment thus providing substantially unobstructed access to the battery compartment by opening the battery compartment door to the open position; positioning forks of a forked material-handling vehicle beneath the battery; employing the forks to lift the battery top to a battery movement height that is less than the compartment height and greater than the stopper block height to reduce contact between the battery and a battery-contact portion of a retention jaw positioned in proximity to the battery opening, wherein the battery-contact portion is operatively associated with a barrier portion that is at a battery-retention position when a battery contacts the battery-contact portion, wherein lifting of the battery to the movement height causes the barrier portion to assume a battery-release position to allow the battery to be extricated through the battery opening at the battery movement height; and moving the forks out through the battery opening while they are supporting the battery.

In some additional, alternative, or selectively cumulative embodiments, a method for retaining a battery within a battery compartment of a material-handling vehicle comprises: causing a battery-retention mechanism comprising a stopper block to move the stopper block from within a battery compartment to a position that is at least substantially external to the battery compartment, wherein the battery has a battery weight, a battery height from a battery base to a battery top, a battery width between first and second battery sides, and a battery depth between a battery front and a battery back, wherein that battery compartment has a battery compartment door, wherein the battery compartment includes first and second side retainers, an upper structure, and a battery-receiving surface, wherein the battery compartment includes a receptacle that spans between the first and second side retainers and between the battery-receiving surface and the upper structure, wherein the battery compartment has a compartment height between the battery-receiving surface and the upper structure, wherein the battery compartment has a compartment width between the first and second side retainers; wherein causing the stopper block to move to a position that is at least substantially external to the battery compartment provides substantially unobstructed access to the battery compartment by opening the battery compartment door to an open position; inserting the battery into the receptacle so that the front and back of the battery are completely within the battery compartment; causing a barrier portion of a retention jaw to move to a battery-retention position by engaging the battery with a battery-contact portion of the retention jaw wherein the battery-contact portion is operatively associated with the barrier portion; and causing the battery-retention mechanism to position the stopper block in the battery compartment by closing the battery door to a closed position.

In some additional, alternative, or selectively cumulative embodiments, a material-handling vehicle comprises: a frame; a drive wheel connected to the frame; a seat; a battery compartment supported by the frame, wherein the battery compartment includes a plurality of side walls, an upper structure, and a bottom structure configured to receive a battery, wherein a battery receptacle spans between the side walls, the bottom structure, and the upper structure, wherein the battery receptacle includes a battery opening sized to allow a battery to pass through the battery opening, and wherein the battery compartment is located at least partly under the seat; a retention jaw positioned in proximity to the battery opening, wherein the retention jaw includes a battery-contact portion operatively associated with a barrier portion, wherein the barrier portion is movable between a battery-retention position and a battery-release position, wherein the barrier portion is at the battery-retention position when a battery contacts the battery-contact portion, and wherein the barrier portion is at the battery-release position when a battery does not contact the battery-contact portion; a battery compartment door operable to provide an open position in which the battery opening is unobstructed and operable to provide a closed position in which the battery opening is obstructed; and a battery-retention mechanism operatively associated with the battery compartment door, the battery-retention mechanism comprising a stopper block that is operable to be positioned within the battery compartment when the battery compartment door is in the closed position and operable to be positioned at least substantially external to the battery compartment and provide substantially unobstructed access to the battery compartment when the battery compartment door is in the open position.

In some additional, alternative, or selectively cumulative embodiments, a battery has a battery bottom, and a battery compartment includes a plurality of side walls, an upper structure, and a bottom structure configured to receive a battery. A system for retaining the battery in the battery compartment of a material-handling vehicle comprises barrier means for retaining the bottom of the battery within the battery compartment, wherein the barrier means is engaged in response to applied weight by the battery; a battery compartment door operable to provide an open position in which the battery opening is unobstructed and operable to provide a closed position in which the battery opening is obstructed; and battery top retention means operable to be positioned within the battery compartment when the battery compartment door is in the closed position and operable to be positioned at least substantially external to the battery compartment and to provide substantially unobstructed access to the battery compartment when the battery compartment door is in the open position, wherein the battery top retention means is operable to limit movement of the battery toward the upper structure when the battery compartment door is in the closed position.

In some additional, alternative, or selectively cumulative embodiments, a method for retaining a battery in a battery compartment of a material-handling vehicle comprises: opening a battery compartment door of the battery compartment to an open position in which a battery opening is unobstructed, wherein the battery has a battery height from a battery base to a battery top, and a battery depth between a battery front and a battery back, wherein the battery compartment includes a plurality of side walls, an upper structure, and a bottom structure configured to receive a battery, wherein a battery receptacle spans between the side walls, the bottom structure, and the upper structure, and wherein the battery receptacle includes the battery opening which is sized to allow a battery to pass through the battery opening, wherein the battery compartment door is operatively associated with a battery-retention mechanism comprising a stopper block that is operable to be positioned within the battery compartment at a stopper block height that is closer to the upper structure than to the bottom structure when the battery compartment door is in the closed position and operable to be positioned at least substantially external to the battery compartment and to provide substantially unobstructed access to the battery compartment when the battery compartment door is in the open position; inserting the battery through the battery opening while the battery compartment door is in the open position so that the battery front and the battery back are completely within the battery compartment; lowering the battery to the bottom structure, wherein the battery compartment is operatively associated with a retention jaw positioned in proximity to the battery opening, wherein the retention jaw includes a battery-contact portion operatively associated with a barrier portion, wherein the barrier portion is movable between a battery-retention position and a battery-release position, wherein the barrier portion is at the battery-retention position when a battery contacts the battery-contact portion, and wherein the barrier portion is at the battery-release position when a battery does not contact the battery-contact portion, wherein lowering the battery to the bottom structure brings the battery into contact with the battery-contact portion of the retention jaw, and wherein lowering the battery to the bottom structure lowers the battery top to be lower than the stopper block height; and closing the battery door to be in the closed position such that the stopper block is positioned above the battery top and below the upper structure.

In some additional, alternative, or selectively cumulative embodiments, a system for retaining a battery in a battery compartment of a material-handling vehicle comprises a first hinge pin, wherein the battery has a battery weight, wherein the battery has a battery height from a battery base to a battery top, wherein the battery has a battery width between first and second battery sides, wherein the battery has a battery depth between a battery front and a battery back, wherein the battery compartment includes first and second side retainers and an upper structure, wherein the battery compartment includes a bottom structure having a bottom structure surface, wherein the battery compartment includes a battery opening that spans between the first and second side retainers and between the bottom structure and the upper structure, wherein the battery compartment has a compartment height between the bottom structure and the upper structure, and wherein the battery compartment has a compartment width between the first and second side retainers; a first hinge plate connected to the bottom structure or the first side retainer and in proximity to the battery opening, wherein the first hinge plate includes one or more first hinge plate holes configured to receive the first hinge pin; a first retention jaw including a first end barrier connected to a first shaft having a first shaft distal end and a first shaft proximal end, wherein the first end barrier has a first topmost lip, wherein the first end barrier is closer to the first shaft proximal end than it is to the first shaft distal end, wherein the first shaft includes a first shaft hole configured to receive the first hinge pin, wherein the first shaft hole is positioned between the first end barrier and the first shaft distal end, wherein the first retention jaw has a first barrier portion that extends from the first end barrier to the first shaft hole, wherein the first retention jaw has a first shaft portion that extends from the first shaft distal end to the first shaft hole, wherein the first barrier portion has a first barrier-portion weight, wherein the first shaft portion has a first shaft-portion weight, and wherein the first barrier-portion weight is greater than the first shaft-portion weight such that the first retention jaw is operable to rest in a receiving position with the first topmost lip below the bottom structure surface such that the receiving position is operable to permit the battery to be inserted through the battery opening into the battery compartment between the bottom structure and the upper structure, wherein the first shaft distal end of the first shaft is above the bottom structure surface at a first distal end height in the receiving position, wherein the first distal end height is less than the difference between the compartment height and the battery height with respect to the bottom structure surface, wherein the battery weight is greater than the first barrier-portion weight such that the first shaft distal end of the first shaft is operable to descend to the bottom structure surface in response to the battery being placed completely within the battery compartment and lowered to the bottom structure surface and such that first end barrier is operable to rise to a first lip height above the bottom structure surface in response to the battery being placed completely within the battery compartment and lowered to the bottom structure surface and operable to prevent the battery from exiting the battery compartment along the bottom structure surface; a second hinge pin; a second hinge plate connected to the bottom structure or the second side retainer and in proximity to the battery opening, wherein the second hinge plate includes one or more second hinge plate holes configured to receive the second hinge pin; a second retention jaw including a second end barrier connected to a second shaft having a second shaft distal end and a second shaft proximal end, wherein the second end barrier has a second topmost lip, wherein the second end barrier is closer to the second shaft proximal end than it is to the second shaft distal end, wherein the second shaft includes a second shaft hole configured to receive the second hinge pin, wherein the second shaft hole is positioned between the second end barrier and the second shaft distal end, wherein the second retention jaw has a second barrier portion that extends from the second end barrier to the second shaft hole, wherein the second retention jaw has a second shaft portion that extends from the second shaft distal end to the second shaft hole, wherein the second barrier portion has a second barrier-portion weight, wherein the second shaft portion has a second shaft-portion weight, wherein the second barrier-portion weight is greater than the second shaft-portion weight such that the second retention jaw is operable to rest in a receiving position with the second topmost lip being below the bottom structure surface such that the receiving position is operable to permit the battery to be inserted through the battery opening into the battery compartment between the bottom structure and the upper structure, wherein the second shaft distal end of the second shaft is above the bottom structure surface at a second distal end height in the receiving position, wherein the second distal end height is less than the difference between the compartment height and the battery height with respect to the bottom structure surface, wherein the battery weight is greater than the second barrier-portion weight such that the second shaft distal end of the second shaft is operable to descend to the bottom structure surface in response to the battery being placed completely within the battery compartment and lowered to the bottom structure surface and such that second end barrier is operable to rise to a second lip height above the bottom structure surface in response to the battery being placed completely within the battery compartment and lowered to the bottom structure surface and operable to prevent the battery from exiting the battery compartment along the bottom structure surface; and a door configured to have a door interior side that is adjacent to the battery opening, wherein the door has an open position in which the battery opening is exposed and operable to receive the battery, and wherein a stopper block is connected to the door interior side at a stopper block height such that whenever the door is in a closed position, the stopper block is positioned between the compartment height and the battery height with respect to the bottom structure surface, and such that the stopper block is operable to limit upward movement of the battery to an upward distance that is less than the first or second lip height.

In some additional, alternative, or selectively cumulative embodiments, the bottom structure in proximity to the battery opening is separated into at least two spaced-apart lower structure portions.

In some additional, alternative, or selectively cumulative embodiments, the bottom structure comprises one or more brackets or ledges.

In some additional, alternative, or selectively cumulative embodiments, the barrier portion is operable to obstruct a sufficient portion of the battery opening to prevent extraction of the battery when the battery is within the battery compartment and the battery is in contact with the battery-contact portion of the retention jaw.

In some additional, alternative, or selectively cumulative embodiments, the retention jaw includes a jaw pivotal-connection mechanism in proximity to the battery opening and the bottom structure.

In some additional, alternative, or selectively cumulative embodiments, the retention jaw comprises a jaw hinge.

In some additional, alternative, or selectively cumulative embodiments, the retention jaw employs a jaw pivotal-connection mechanism including a jaw hinge pin configured to fit through a jaw pivot hole in a jaw shaft at a jaw pivot point between the barrier portion and the battery connection portion, wherein the jaw shaft is indirectly connected to the battery compartment.

In some additional, alternative, or selectively cumulative embodiments, a jaw hinge plate is connected to the bottom structure or a side wall and in proximity to the battery opening, and wherein the jaw hinge plate includes one or more jaw hinge plate holes configured to receive the jaw hinge pin.

In some additional, alternative, or selectively cumulative embodiments, the retention jaw has a shape substantially like an "L."

In some additional, alternative, or selectively cumulative embodiments, the barrier portion and the contact portion form relatively transverse planes.

In some additional, alternative, or selectively cumulative embodiments, the barrier portion weighs more than the battery-contact portion.

In some additional, alternative, or selectively cumulative embodiments, the barrier portion includes an end barrier, wherein the battery-contact portion includes a shaft having a shaft distal end that is located further from the barrier portion than a shaft proximal end, wherein the shaft includes a shaft pivot point positioned between the shaft distal end and the shaft proximal end, wherein the barrier portion extends from the end barrier to the shaft pivot point, and wherein the battery-contact portion extends from the shaft distal end to the shaft pivot point.

In some additional, alternative, or selectively cumulative embodiments, the barrier portion includes a topmost lip; wherein the barrier portion is closer to the battery opening than is the battery-contact portion; wherein the barrier portion has a barrier-portion weight; wherein the battery-contact portion has a contact portion weight; wherein the barrier-portion weight is greater than the contact portion weight such that when the battery compartment is empty, the retention jaw is operable to rest in the receiving position such that the topmost lip is at a lip level that is at or below a contact portion level of the battery-contact portion and such that the battery-contact portion is above the bottom structure.

In some additional, alternative, or selectively cumulative embodiments, the battery-retention mechanism is connected to the battery compartment door.

In some additional, alternative, or selectively cumulative embodiments, the battery-retention mechanism is connected to the battery compartment.

In some additional, alternative, or selectively cumulative embodiments, the battery compartment door comprises a stopper guide operable to guide the stopper block into the battery compartment.

In some additional, alternative, or selectively cumulative embodiments, the stopper block is operable to be positioned within the battery compartment when the battery compartment door is engaged with the battery-retention mechanism, and wherein the stopper block is operable to be positioned at least substantially external to the battery compartment and provide substantially unobstructed access to the battery compartment when the battery compartment door is disengaged from the battery-retention mechanism.

In some additional, alternative, or selectively cumulative embodiments, the stopper block is operable to be positioned within the battery compartment at a stopper block height that is closer to the upper structure than to the bottom structure when the battery compartment door is in the closed position.

In some additional, alternative, or selectively cumulative embodiments, the battery compartment door has a door interior side that is operable to be adjacent to the battery opening, and wherein the battery-retention mechanism is connected to the door interior side at a stopper block height that is closer to the upper structure than to the bottom structure when the battery compartment door is in the closed position.

In some additional, alternative, or selectively cumulative embodiments, the barrier portion includes a topmost lip and a barrier base, wherein the topmost lip has a lip height with respect to the barrier base, wherein the stopper block is operable to limit movement of the battery toward the upper structure to an upper distance limit that is smaller than the lip height.

In some additional, alternative, or selectively cumulative embodiments, the battery-retention mechanism employs a stopper block hinge that is operable for rotation of the stopper block into the battery compartment as the battery compartment door achieves the closed position, and wherein the stopper block hinge is operable for rotation of the stopper block out of the battery compartment when the battery compartment door is in the open position.

In some additional, alternative, or selectively cumulative embodiments, the battery-contact portion has a battery portion weight, wherein the battery has a battery weight and a battery height with respect to a bottom structure surface of the bottom structure, wherein the battery compartment has a compartment height between the bottom structure and the upper structure, wherein receiving position is operable to permit the battery to be inserted through the battery opening into the battery compartment between the bottom structure and the upper structure, wherein the battery-contact portion is above the bottom structure surface at a contact height in the receiving position, wherein the contact height is less than the difference between the compartment height and the battery height with respect to the bottom structure surface, and wherein the barrier-portion weight is less than the battery weight such that the battery-contact portion is operable to descend to the bottom structure surface in response to the battery being placed completely within the battery compartment and lowered to the bottom structure surface and such that the barrier portion is operable to rise to a securing position above the bottom structure surface in response to the battery being placed completely within the battery compartment and lowered to the bottom structure surface and operable to prevent the battery from exiting the battery compartment along the bottom structure surface when the barrier portion is in the securing position.

In some additional, alternative, or selectively cumulative embodiments, the side walls include first and second side walls, the retention jaw is a first retention jaw and is positioned in proximity to the first side wall, a second retention jaw positioned in proximity to the second side wall and the battery opening, the second retention jaw includes a battery-contact portion operatively associated with a barrier portion, the barrier portion is movable between a battery-retention position and a battery-release position, the barrier portion is at the battery-retention position when a battery contacts the battery-contact portion, and the barrier portion is at the battery-release position when a battery does not contact the battery-contact portion.

In some additional, alternative, or selectively cumulative embodiments, the battery compartment door employs one or more door hinges such that the battery compartment door maintains a direct or indirect connection to the battery compartment when the battery compartment door is in the open position.

In some additional, alternative, or selectively cumulative embodiments, the battery compartment door employs multiple door hinges, including first and second door hinges that have different capabilities.

In some additional, alternative, or selectively cumulative embodiments, at least one of the door hinges comprises a double-axis hinge.

In some additional, alternative, or selectively cumulative embodiments, at least one of the double-axis hinges employs a torsion spring on one axis.

Selectively cumulative embodiments are embodiments that include any combination of multiple embodiments that are not mutually exclusive.

Additional aspects and advantages will be apparent from the following detailed description of example embodiments, which proceeds with reference to the accompanying drawings.

BRIEF DESCRIPTION OF THE DRAWINGS

FIG. 16 is a top plan view showing an empty battery compartment with the battery compartment door in a fully open position.

FIG. 17 is a top plan view showing in solid lines a battery in a battery compartment with the battery compartment door in a closed position and in broken lines a second position of a battery-retention mechanism.

DETAILED DESCRIPTION OF EMBODIMENTS

Figure 1:
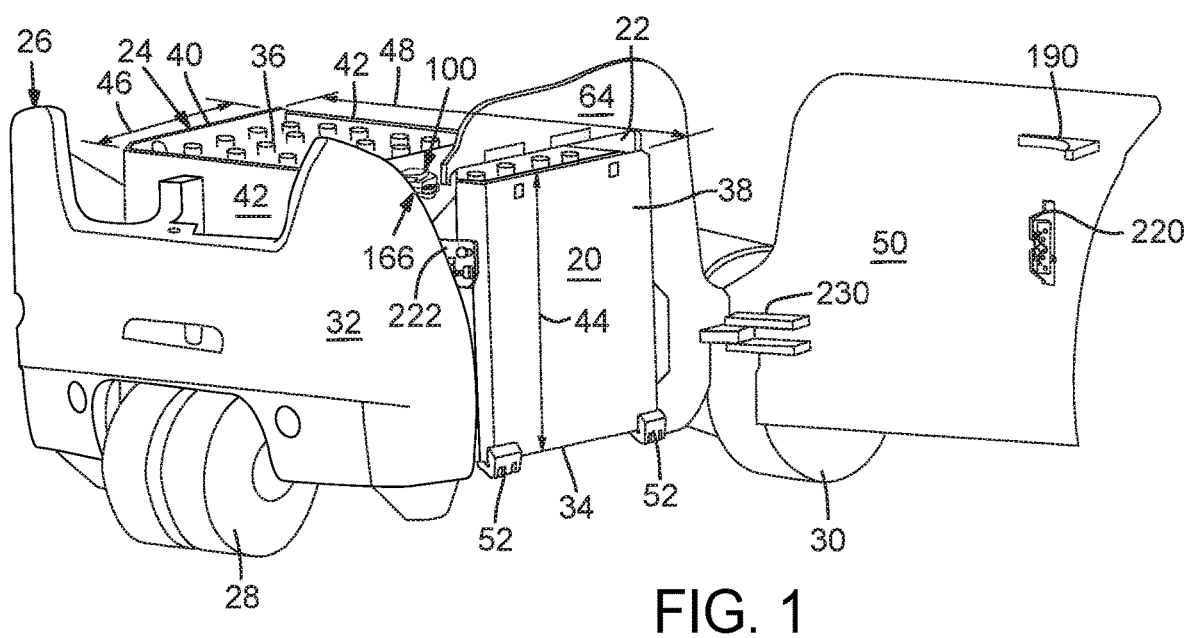
FIG. 1 is an isometric view showing a battery within a battery compartment of a material-handling vehicle.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," "comprising," "includes," "include," "including," "have," "has," and having" when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein.

FIG. 1 is an isometric view showing a battery 20 within a battery receptacle 22 of a battery compartment 24 of an industrial vehicle, such as material-handling vehicle 26. With reference to FIG. 1, the material-handling vehicle 26 may include any type of material transport vehicle or lift truck. Moreover, the material-handling vehicles 26 may include battery side-extract trucks, such as trucks in the 1- to 2-ton range or in the 2- to 3-ton range. Of course, the material-handling vehicles 26 could be lighter or heavier. Lift trucks may include forklift trucks such as counter balanced forklift trucks or pallet trucks, such as one of the HYSTER W45ZHD2 or YALE MPB045ZH manufactured by the Hyster-Yale Group, 5200 Martin Luther King Junior Highway, Greenville, N.C. 27834. These lift trucks often incorporate multiple components such as counterweights (not shown), a hydraulic system (not shown), electronics (not shown), an energy source (such as the battery 20), wheels (such as one or more drive wheels 28 and nondrive wheels 30), a steering mechanism (not shown), an operator's seat (not shown) within an operator compartment, and a lift assembly (not shown), all supported by the truck's chassis or frame 32.

The battery 20 can be any type of battery including, but not limited to, a lead acid battery, a lithium-ion battery, or a bank of multiple such batteries. For purposes of this disclosure, a bank of batteries may be referred to as a "battery" 20. The battery 20 may include a battery bottom 34, a battery top 36, a battery front 38, a battery back 40, and battery sides 42. The battery 20 may also have a battery height 44 between the battery bottom 34 and the battery top 36, a battery width 46 between the battery sides 42, and a battery depth 48 between the battery front 38 and the battery back 40.

For smaller capacity range material-handling vehicles 26 in the 1.5- to 2-ton range, example batteries 20 may conform to DIN 43531A. Example batteries 20 may have a width 46 from about 700 mm to 1000 mm, some having a somewhat standard maximum width of 830 mm. Example batteries 20 may have a depth 48 from about 400 mm to 738 mm, about 450 mm to 630 mm, or about 475 mm to 522 mm. The battery compartment 24 or its battery opening 80 may have a height that is between about 550 mm and 700 mm. An example height for the battery compartment 24 or the battery opening 80 may be about 627 mm+/−2 mm.

For medium capacity range material-handling vehicles 26 in the 2- to 3.5-ton range, example batteries 20 may conform to DIN 43536 TYPE G. Example batteries 20 may have a width 46 from about 900 mm to 1100 mm, some having a somewhat standard maximum width of 1028 mm. Example batteries 20 may have a depth 48 from about 625 mm to 900 mm, about 650 mm to 800 mm, or about 675 mm to 750 mm. The battery compartment 24 or its battery opening 80 may have a height that is between about 650 mm and 800 mm.

An example height for the battery compartment 24 or the battery opening 80 may be about 784 mm+/−2 mm.

A conventional battery 20 has a battery weight that is less than 2000 kg and greater than 250 kg, 500 kg, 1000 kg, 1250 kg, or 1500 kg. The smaller size material-handling vehicles may have batteries with a maximum weight of about 1064 kg. The medium size material-handling vehicles may have batteries with a maximum weight of about 956 kg. One will appreciate, however, that the battery 20 may weigh less than 250 kg or weigh more than 2000 kg.

The battery compartment 24 that is configured for housing the battery 20 may be located under the operator seat or at another desirable location. Material-handling vehicles 26 may have different battery configurations and sizes that may not be directly under the driver or operator seat. The dimensions of the battery compartment 24 may be about 2 mm to 10 greater than the battery width 46 and the battery depth 48, with a typical dimension being about 66 mm greater.

Figure 2:
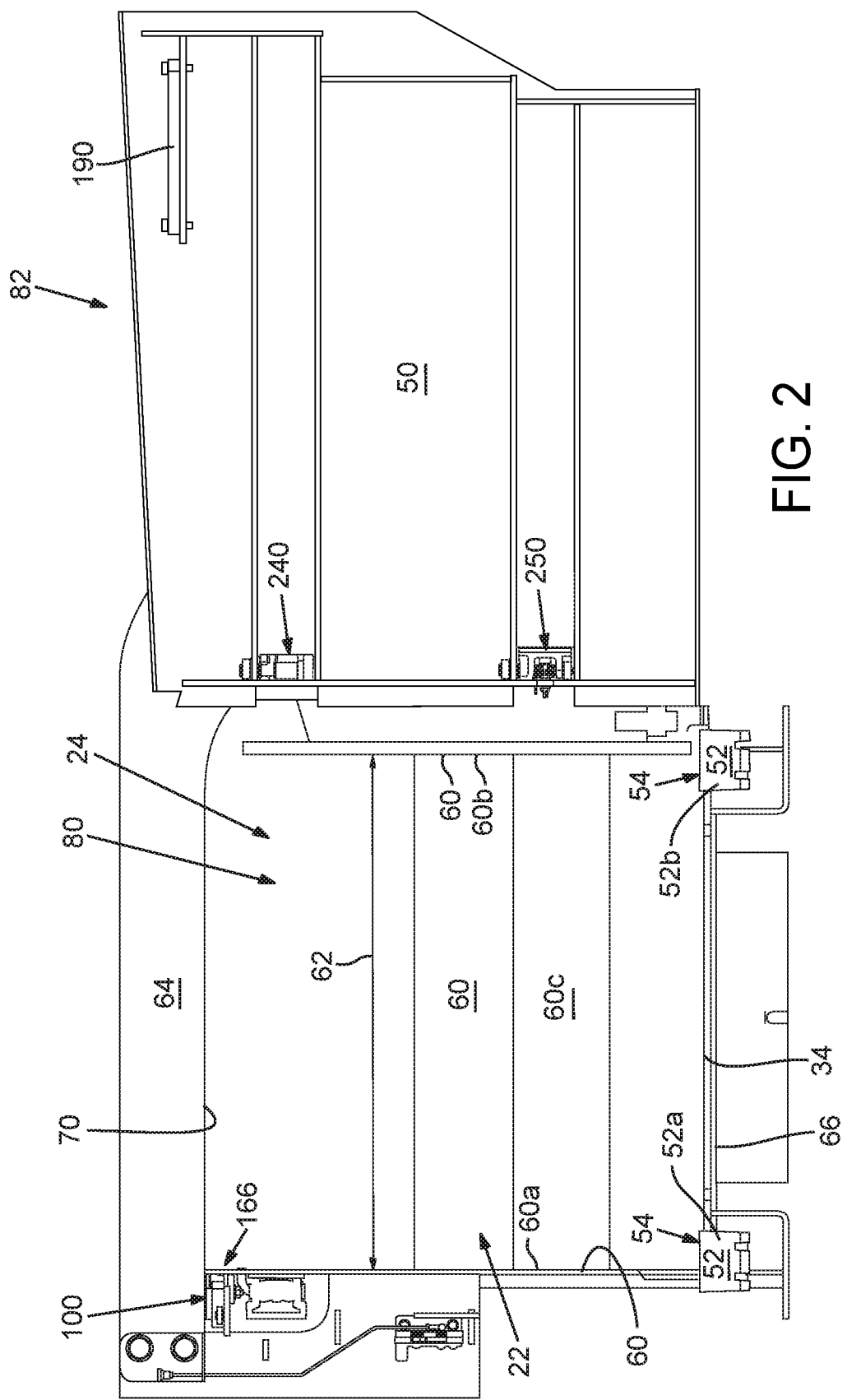
FIG. 2 is a front elevation view showing an empty battery compartment with a fully open battery compartment door and with retention jaws in a battery-release position.
Figure 3:
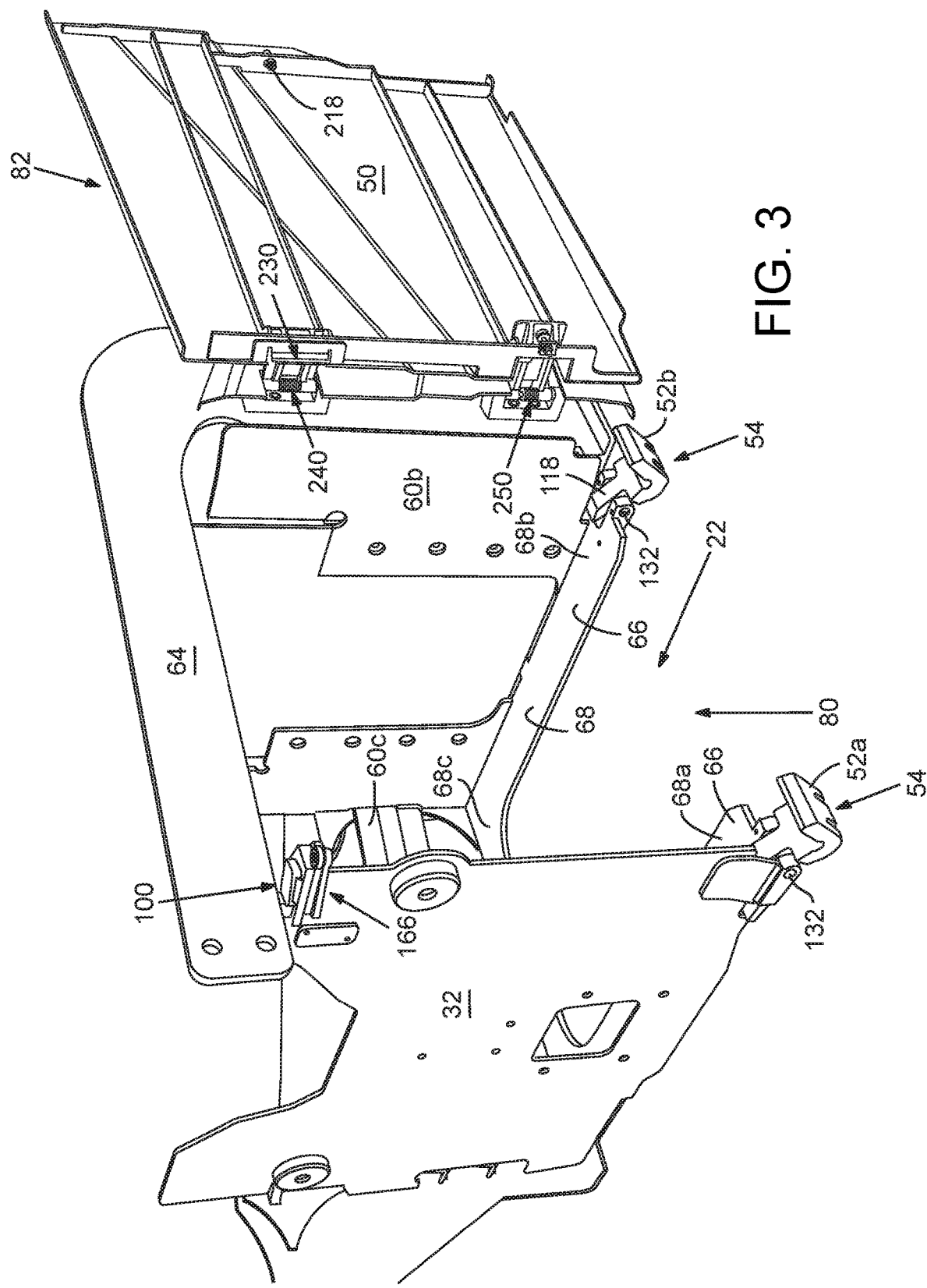
FIG. 3 is a side, front, top perspective view showing an empty battery compartment with a fully open battery compartment door and with retention jaws in a battery-release position.
Figure 4:
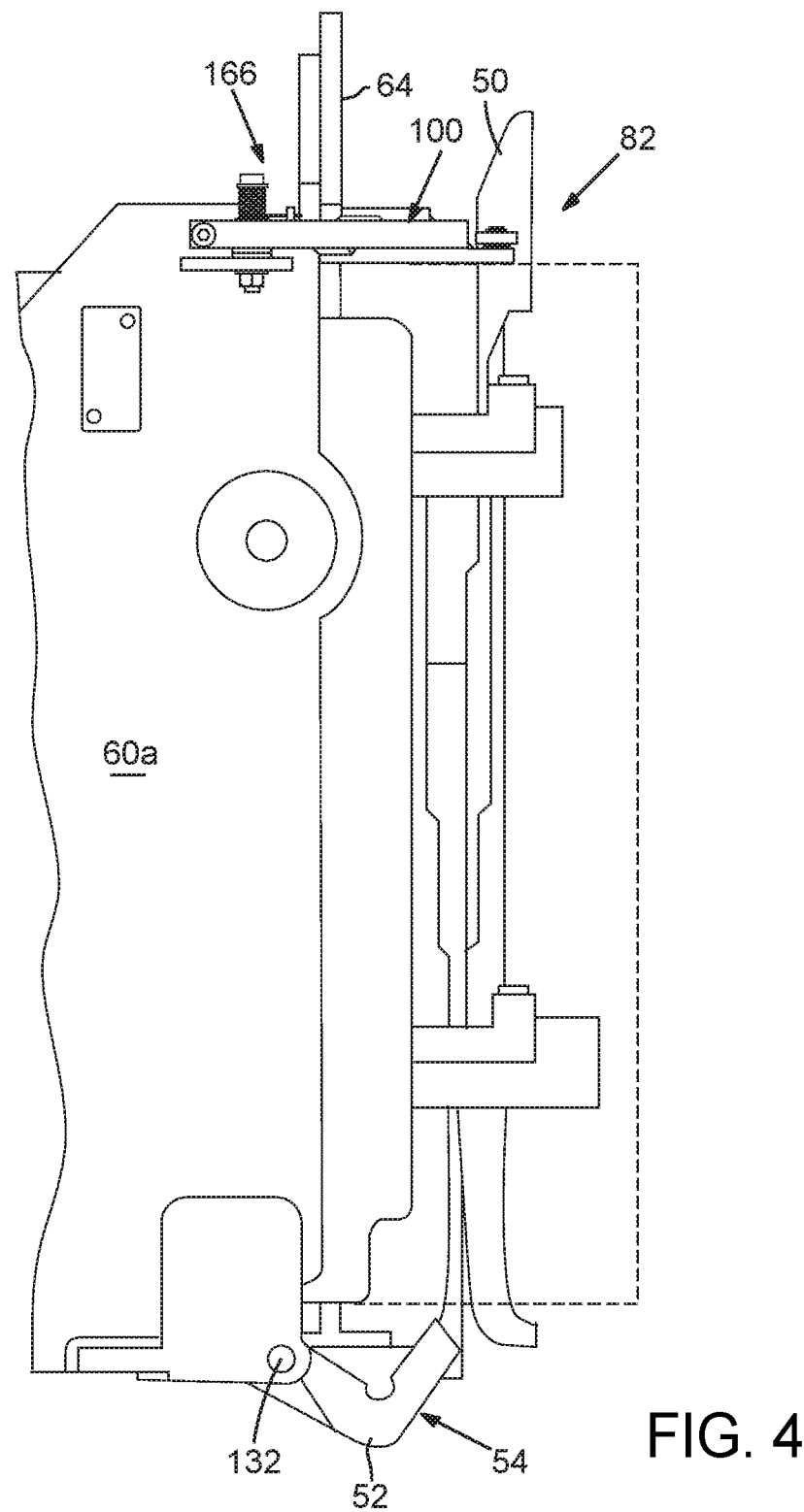
FIG. 4 is a side elevation view showing a battery compartment with a fully open battery compartment door and with retention jaws in a battery-release position in the absence of a battery.

FIG. 2 is a front elevation view showing an empty battery compartment 24 with a fully open battery compartment door 50 and with retention jaws 52, such as a retention jaw 52a and a retention jaw 52b, in a battery-release position 54; FIG. 3 is a side, front, top perspective view showing the empty battery compartment 24 with the fully open battery compartment door 50 and with the retention jaws 52 in the battery-release position 54; FIG. 4 is a side elevation view showing the battery compartment 24 with the fully open battery compartment door 50 and with the retention jaws 52 in the battery-release position 54 in the absence of the battery 20; and FIG. 5 is a front elevation view showing a closed battery compartment door 50 and the retention jaws 52 in the battery-release position 54 in the absence of a battery 20.

Figure 5:
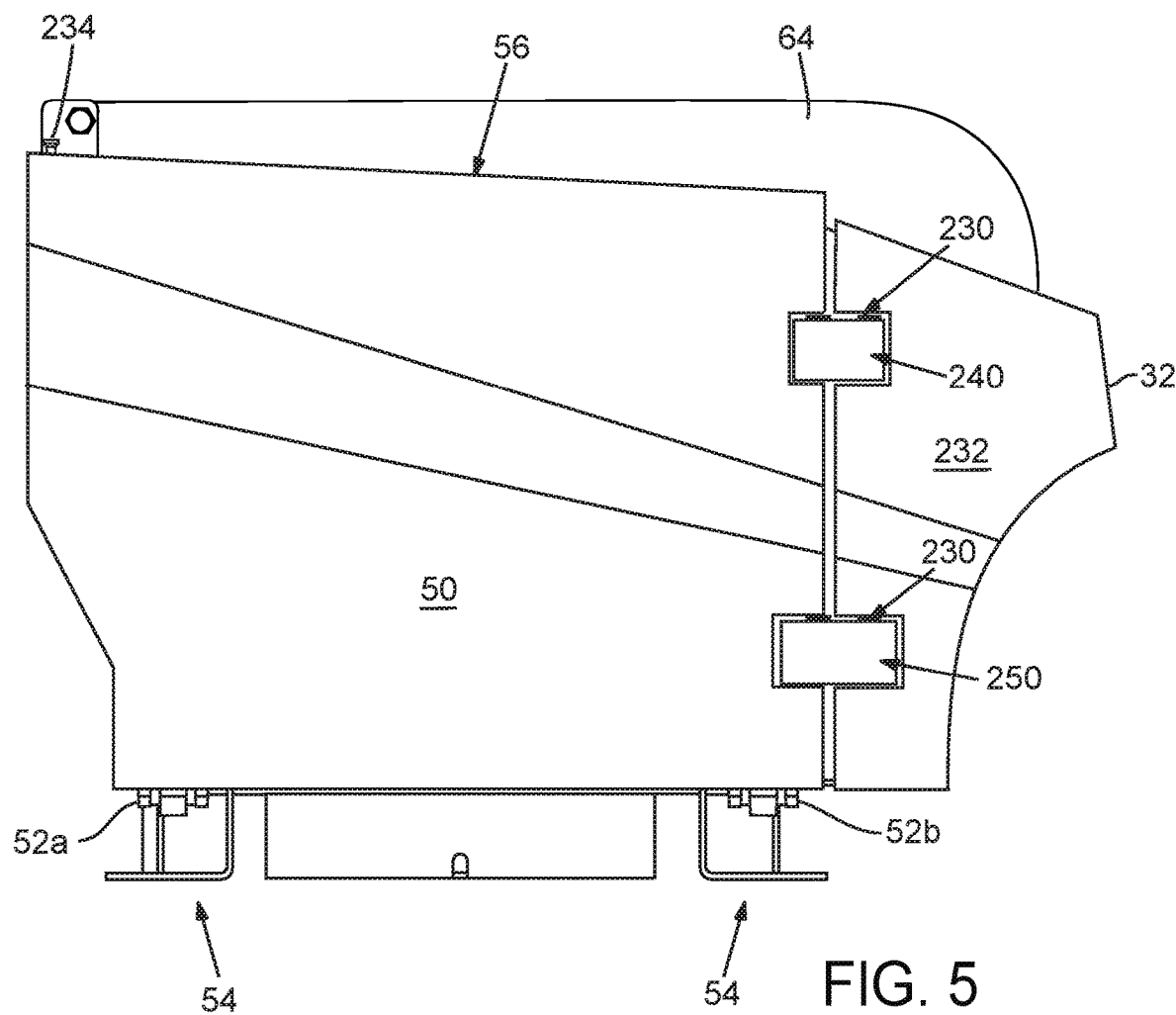
FIG. 5 is a front elevation view showing a closed battery compartment door and retention jaws in a battery-release position in the absence of a battery.

With reference to FIGS. 2-5, the battery compartment 24 includes a plurality of side walls 60, such as a left side wall 60a, a right side wall 60b, and a rear side wall 60c. The walls 60 may be uniform and continuous or they may include windows, recesses, slots, or other forms of breaks or apertures. Apertures in the battery compartment may facilitate heat dissipation. The battery compartment 24 has a compartment width 62 that spans between the left side wall 60a and the right side wall 60b, and the battery compartment 24 has a compartment depth 58 that spans between the rear side wall 60c and the battery compartment door 50 when it is in a closed position 56 (FIG. 5). Accordingly, the compartment width 62 is greater than or equal to the battery width 46, and the compartment depth 56 is greater than or equal to the battery depth 48.

The battery compartment 24 also includes an upper structure 64 and a bottom structure 66 configured to support the battery 20, hence the battery compartment 24 may have a compartment height between the battery bottom structure (or receiving surface) 66 and the upper structure 64. The bottom structure 66 may include at least two spaced-apart lower structure portions, especially in proximity to a battery opening 80, as later described. For example, the bottom structure 66 may include one or more brackets or ledges 68, such as ledges 68a, 68b, and 68c. The ledges 68 may span continuously along the base of one or more of the side walls 60, or the ledges 68 may be separated into discrete shelves that span along only portions of the side walls 60. In an alternative embodiment, the bottom structure 66 may include one or more spaced-apart slats (not shown) supported by a compartment floor (not shown). The slats could run parallel to the side walls 60a and 60b.

In an embodiment shown in FIGS. 2 and 3, the upper structure 64 extends across the tops of the side walls 60a and 60b and can be referred to as an elephant trunk because of its shape. More generally, the upper structure 64 may be a part of the frame 32 or may be a distinct element. The upper structure 64 can have a frame-like thickness, covering only a small portion of the battery; or, the upper structure can cover a major portion of the battery 20. Or, the upper structure can cover any amount of the battery 20 from a small portion to a major portion. The upper structure 64 may also be distinct from a battery compartment ceiling (not shown) and may have an underside surface 70 that defines a receptacle height 72 between the bottom structure 66 and the underside surface 70.

The battery receptacle 22 may be smaller than the battery compartment 24 and may span between the side walls 60, the bottom structure 66, and the upper structure 64. Moreover, the battery receptacle 22 includes a battery opening 80 that is sized to allow the battery 20 to pass through the battery opening 80. In general, the battery opening 80 is unobstructed when the battery compartment door 50 assumes a suitably open position, and the battery opening 80 is obstructed when the battery compartment door assumes a closed position 56.

Figure 6:
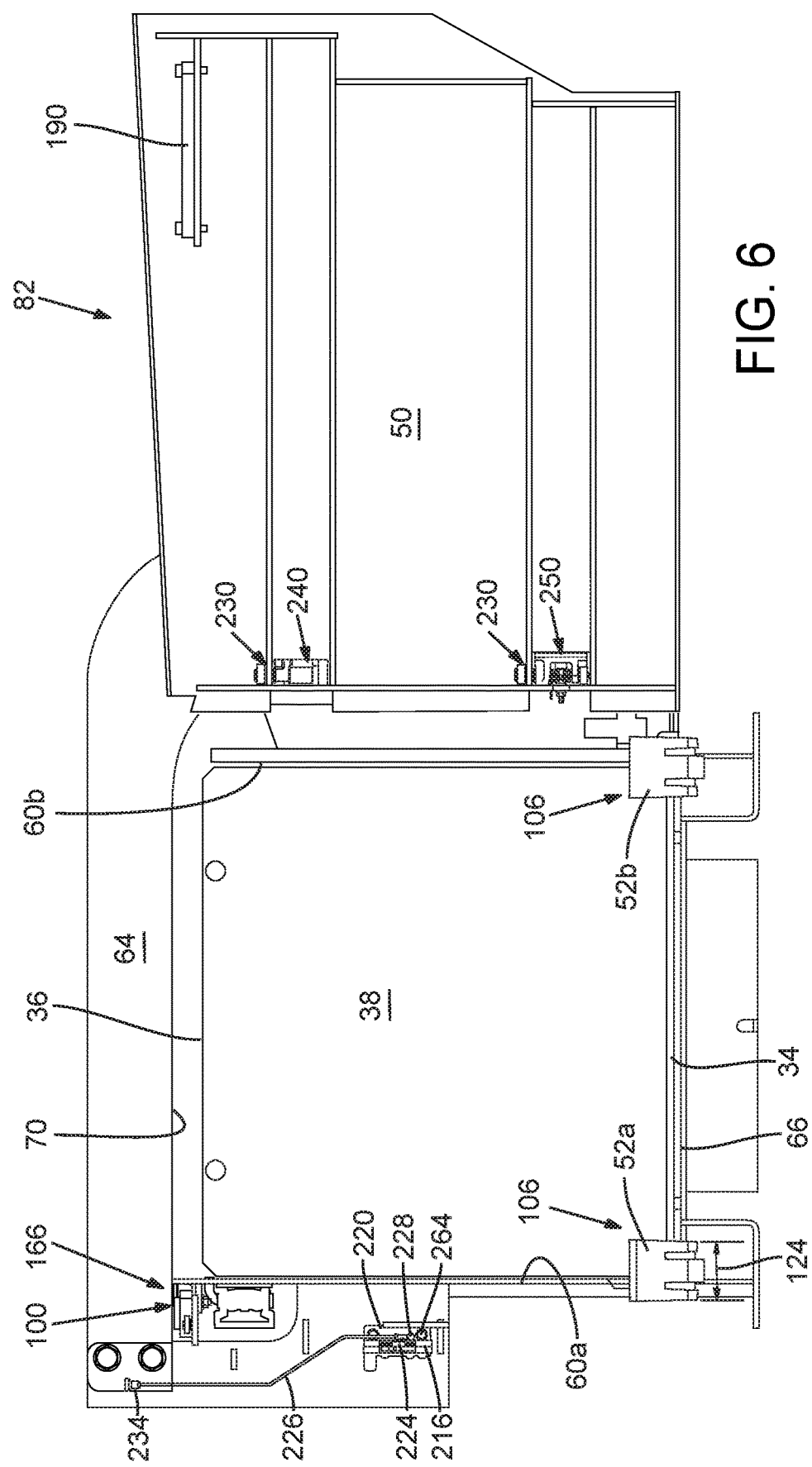
FIG. 6 is a front elevation view showing retention jaws that secure a battery within a battery compartment having a fully open battery compartment door.
Figure 7:
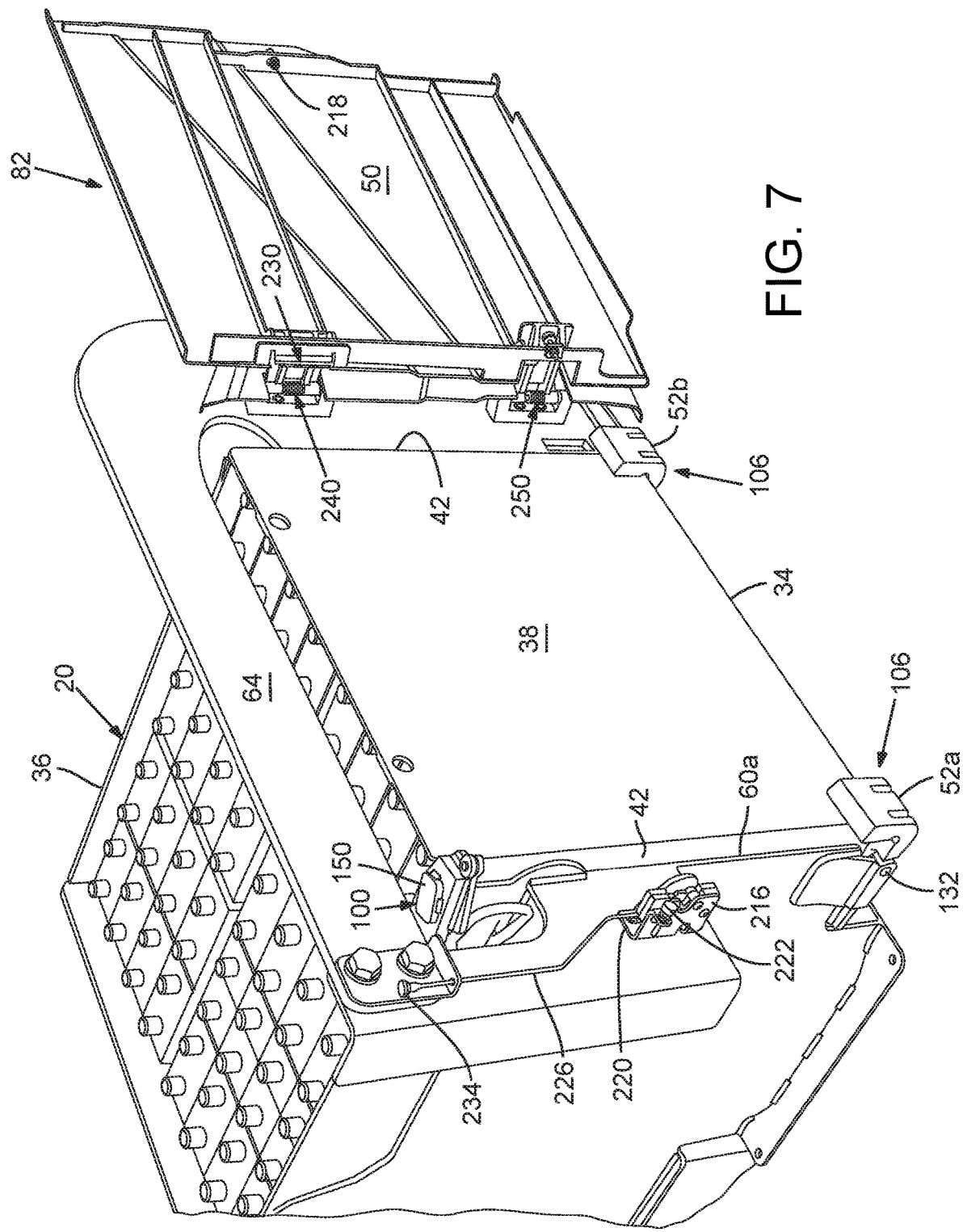
FIG. 7 is a side, front, top perspective view showing retention jaws that secure a battery within a battery compartment having a fully open battery compartment door.
Figure 8:
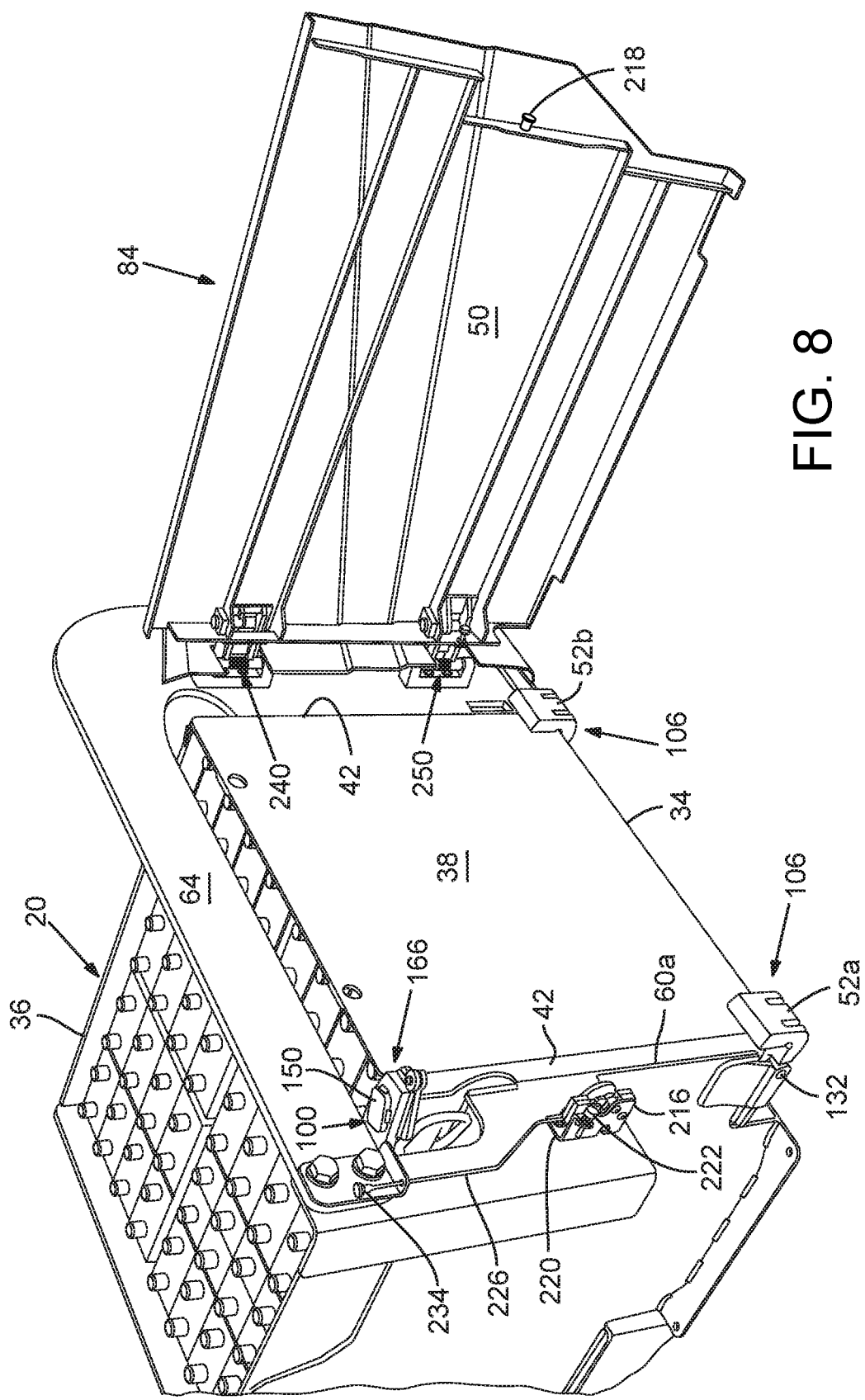
FIG. 8 is a side, front, top perspective view showing retention jaws that secure a battery within a battery compartment having a partially open battery compartment door.
Figure 9:
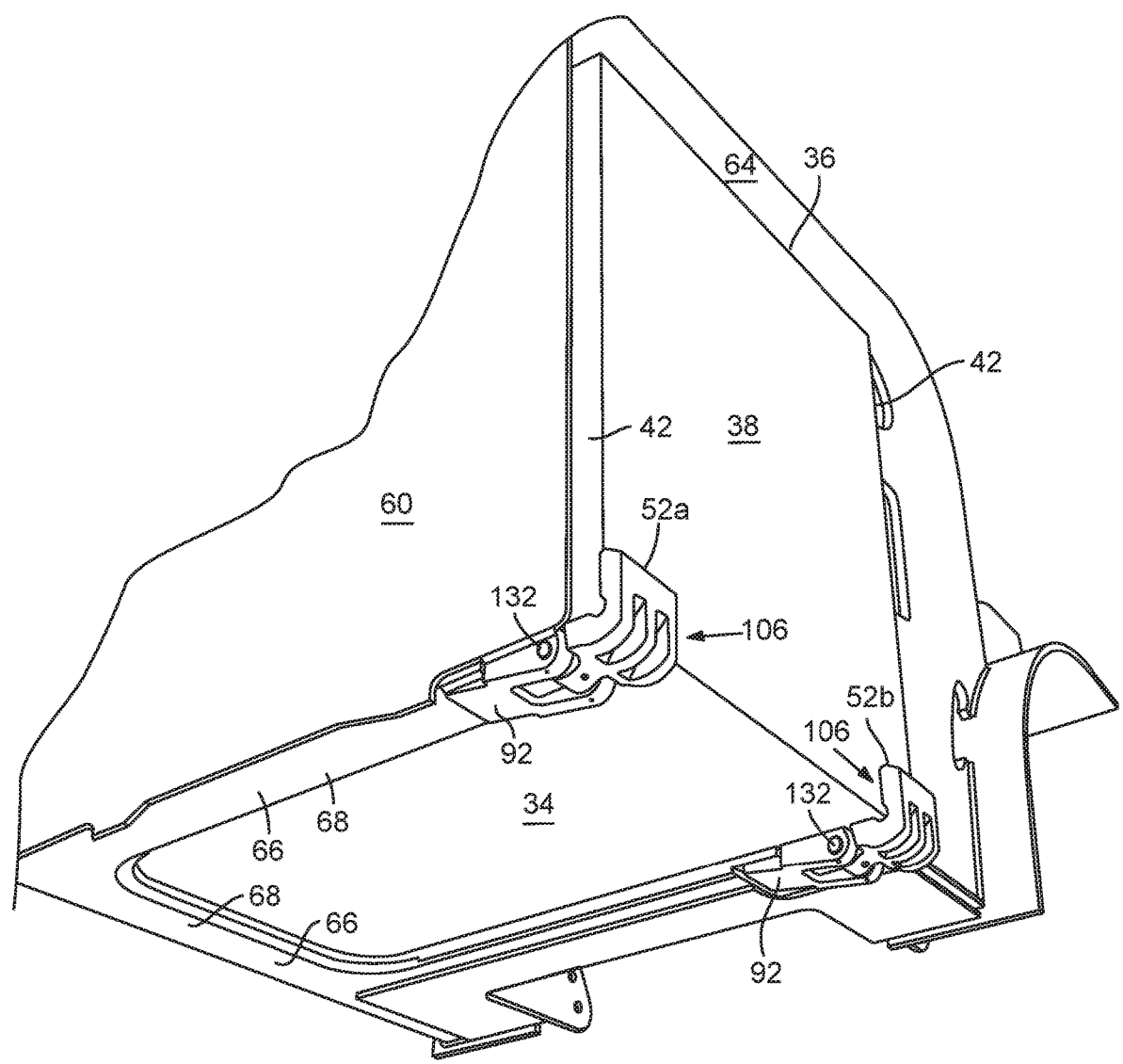
FIG. 9 is a side, bottom, front perspective view showing retention jaws that secure a battery within a battery compartment with the battery compartment door removed.
Figure 10:
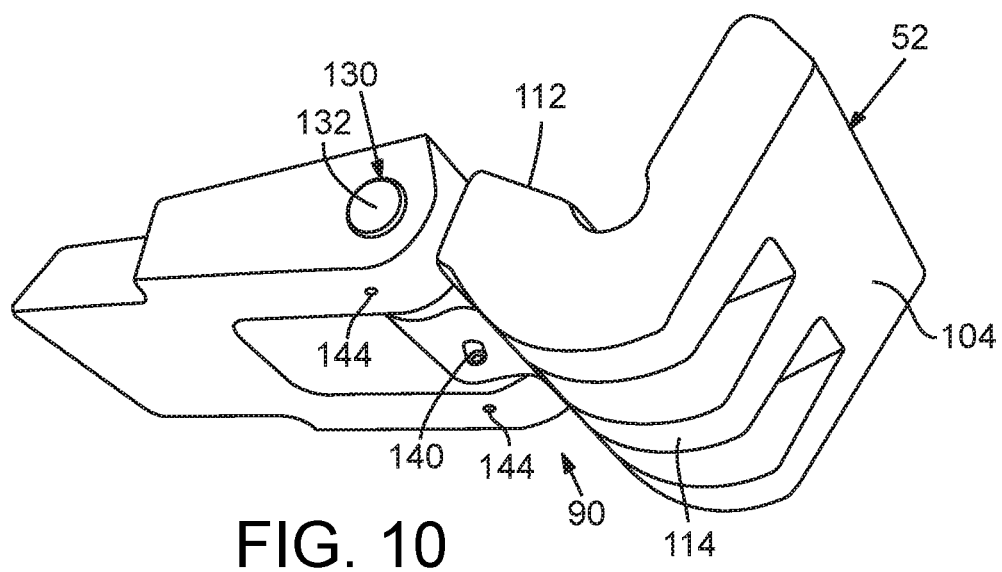
FIG. 10 is a side, bottom, front perspective view showing a retention jaw assembly including a retention jaw and a hinge plate.
Figure 11:
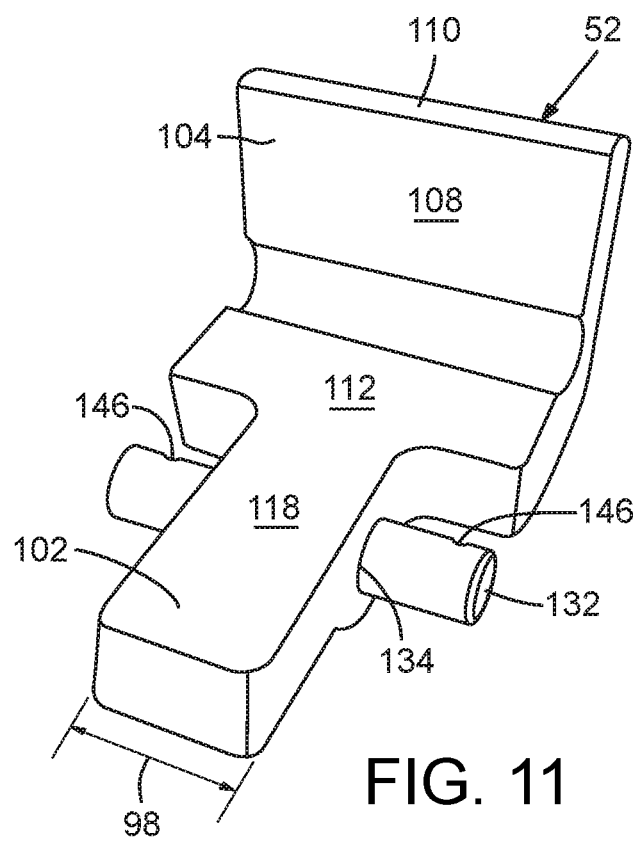
FIG. 11 is a top, rear, side perspective view showing a retention jaw.
Figure 12:
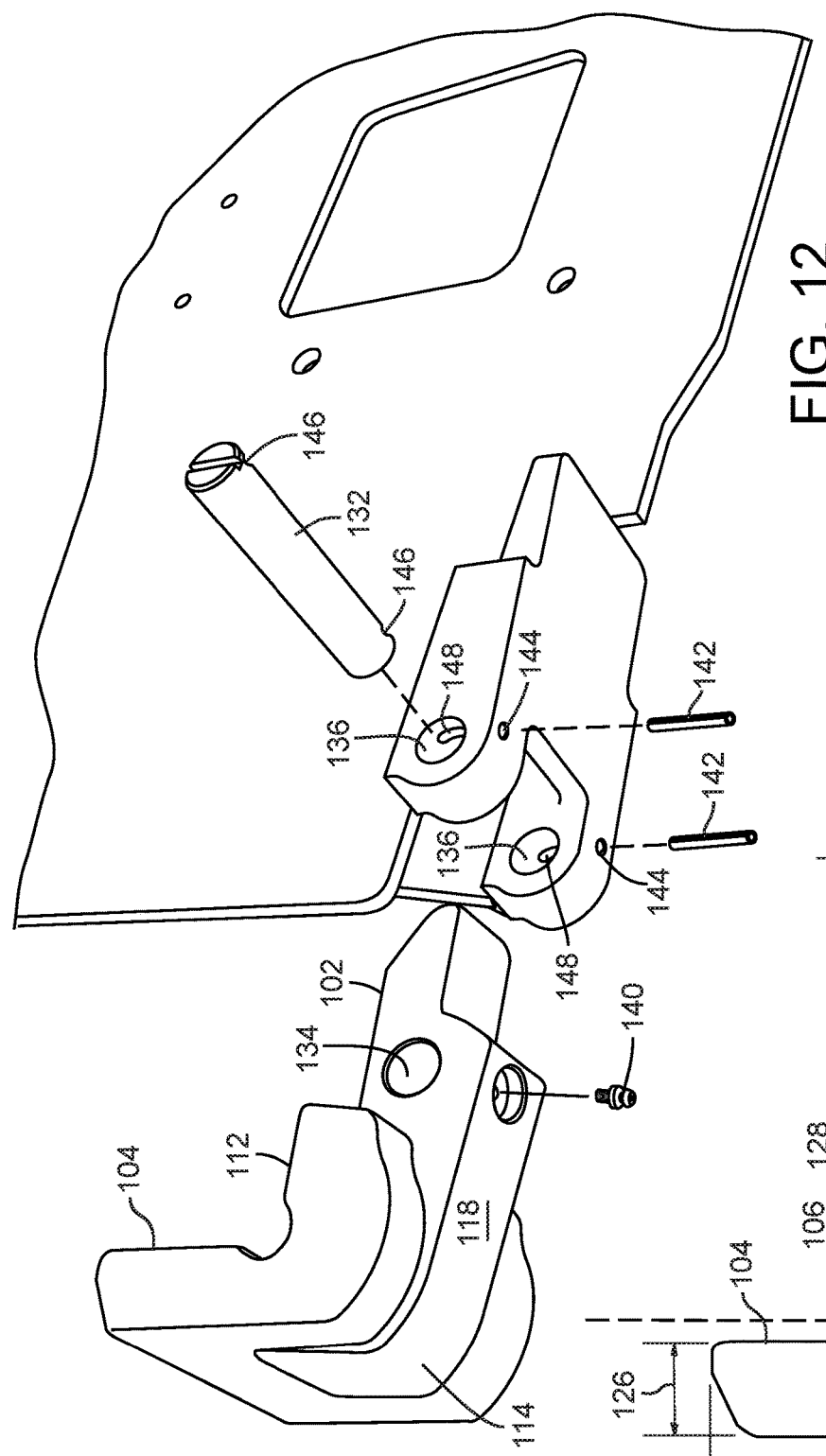
FIG. 12 is an exploded view of a retention jaw assembly including a retention jaw and a hinge plate.
Figure 13:
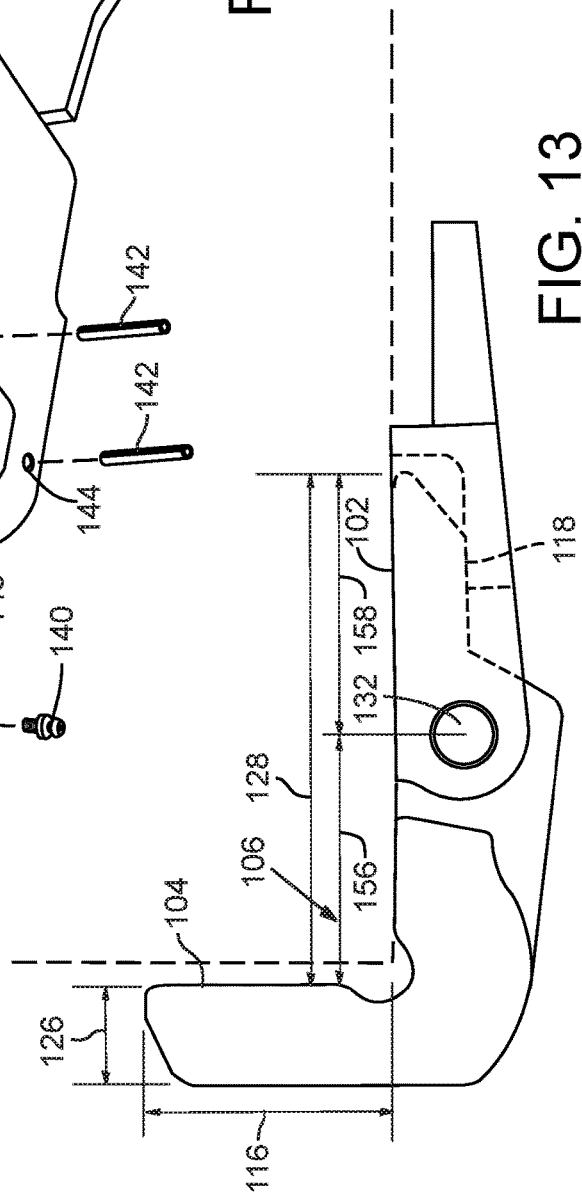
FIG. 13 is a side elevation view of a retention jaw assembly including a retention jaw and a hinge plate.

FIG. 6 is a front elevation view showing the retention jaws 52 securing the battery 20 within the battery compartment 24 with the battery compartment door 50 in a fully open position 82; FIG. 7 is a side, front, top perspective view showing the retention jaws 52 securing the battery 20 within the battery compartment 24 with the battery compartment door 50 in the fully open position 82; FIG. 8 is a side, front, top perspective view showing the retention jaws 52 securing the battery 20 within a battery compartment with the battery compartment door 50 in a half-opened position 84; FIG. 9 is a side, bottom, front perspective view showing the retention jaws 52 securing the battery 20 within the battery compartment 24 in the absence of the battery compartment door 50; FIG. 10 is a side, bottom, front perspective view showing a retention jaw assembly 90 including the retention jaw 52 and a hinge plate 92; FIG. 11 is a top, rear, side perspective view showing the retention jaw 52; FIG. 12 is an exploded view of the retention jaw assembly 90 including the retention jaw 52 and the hinge plate 92; and FIG. 13 is a side elevation view of the retention jaw assembly 90 including the retention jaw 52 and the hinge plate 92.

With reference to FIGS. 1-13, a retention system for securing the battery 20 within the battery compartment 24 may include a retention mechanism 100 and one or more retention jaw assemblies 90 that may each include a retention jaw 52. In some embodiments, the jaw retention assembly 90 may constitute an over-the-center pivoting clamp. The retention jaw assemblies 90 may be positioned in proximity to the battery opening 80 and in proximity to the bottom structure 60. The position of the jaw assembly 90 may be determined by the depth of the battery 20 within the battery compartment 24.

If a single retention jaw assembly 90 is employed, it may be located roughly equidistant to the side walls 60a and 60b. When multiple retention jaw assemblies 90 are employed, they are typically spaced apart. If two retention jaw assemblies 90 are employed, they may be positioned so that one jaw assembly 90 is positioned in proximity to the side wall 60a and the other may be positioned in proximity to the side wall 60b. For convenience, "in proximity" may be interpreted to be within 10 cm, within 7.5 cm, within 5 cm, or within 2.5 cm.

As previously noted, the retention jaw assembly 90 may "horizontally" retain the battery 20 and may limit movement of the battery 20 within a battery compartment 24. The retention jaw 52 may also function to stop the battery 20 from potentially banging into, and opening, the battery compartment door 50 and shooting out sideways through the battery opening 80, during normal operation of the material-handling vehicle 26 or during likely impacts, especially if the material-handling vehicle 26 is turning and bumps into a solid object.

The retention jaw assembly 90 may include a retention jaw 52 and a hinge plate 92. The retention jaw 52 may include a battery-contact portion 102 that is operatively associated with a barrier portion 104 that is movable between a battery-retention position 106, as shown in FIGS. 6-9, and the battery-release position 54, as shown in FIGS. 2-5. The barrier portion 104 may be at the battery-retention position 106 when the battery 20 contacts the battery-contact portion 102, and the barrier portion 104 may be at the battery-release position 54 when the battery 20 does not contact the battery-contact portion 102.

The barrier portion 104 may include an end barrier 108 having a topmost lip 110, a barrier base 112, and a barrier underside 114. The end barrier 108 may have a vertical distance between the barrier base 112 and the topmost lip 110 that determines a barrier height 116 (FIG. 13). The barrier base 112 and the end barrier 108 may be transversely or perpendicularly oriented to each other and may generally form an "L" shape.

The barrier height 116 may be tall enough to retain the battery 20 when the barrier portion 104 is at the battery-retention position 106 and may be short enough to be close to or below the level of the bottom structure 66 when the barrier portion 104 is at the battery-release position 54. In some examples, the barrier height 116 is between 30 and 120 mm, 50 and 100 mm, or 60 and 80 mm. One will appreciate, however, that the barrier height 116 can be shorter than 30 mm or taller than 120 mm. In some examples, the barrier portion 104 or the barrier base 112 may have a barrier width 124 (FIG. 6) that is between 50 and 150 mm, 75 and 125 mm, or 90 and 110 mm. One will appreciate, however, that the barrier width 124 can be narrower than 50 mm or wider than 150 mm. In some examples, the topmost lip 110 may have a lip thickness 126 (FIG. 13) that is between 10 and 50 mm, 15 and 40 mm, or 20 and 35 mm. One will appreciate, however, that the lip thickness 126 can be smaller than 10 mm or larger than 50 mm.

The retention jaw 52 may also include a jaw shank or jaw shaft 118 that is connected to the end barrier 108. The jaw shaft 118 may have shaft proximal end 120 and a shaft distal end 122, wherein the end barrier 108 is closer to the shaft proximal end 120 than it is to the shaft distal end 122. The battery-contact portion 102 may include a portion of, or be attached to, the jaw shaft 118. The retention jaw 52 can be cast or forged steel or other metal, or they can be machined from billets of steel or other metal. In some examples, the jaw shaft 118 may have a shaft length 128 (FIG. 13) that is between 90 and 180 mm, 110 and 160 mm, or 130 and 150 mm. One will appreciate, however, that the shaft length 128 can be shorter than 90 mm or longer than 180 mm.

In some examples, the jaw shaft 118 may have a shaft width 98 (FIG. 11) that is between 15 and 70 mm, 20 and 60 mm, or 30 and 50 mm. One will appreciate, however, that the shaft width 98 can be shorter than 15 mm or longer than 70 mm. In some examples, the jaw shaft 118 may have a shaft height 96 (FIG. 13) in proximity to the shaft pivot point 134 that is between 20 and 80 mm, 30 and 70 mm, or 40 and 60 mm. One will appreciate, however, that the shaft height 96 can be shorter than 20 mm or taller than 80 mm. One will also appreciate that the jaw shaft 118 may have different shaft heights 96 along its length. In particular, the shaft height 96 may be largest in proximity to the shaft pivot point 134 and shorter along different portions, especially toward the shaft distal end 102.

The retention jaw assembly 90 may also include a jaw pivotal-connection mechanism 130, such as a jaw hinge, that can be positioned in proximity to the battery opening 80 and the bottom structure 66. The jaw pivotal-connection mechanism 130 may include a hinge or pivot axle 132 positioned at a shaft pivot point 134 along the jaw shaft between the end barrier 108 and the shaft distal end 122. The pivot axle 132 may be robust to endure normal driving operation, impacts, and loading and unloading of the battery 20. Accordingly, the pivot axle 132 may have a diameter greater than or equal to 10 mm, 15 mm, 17.5 mm, or 20 mm. One will appreciate, however, that the diameter of the pivot axle 132 may be smaller than 10 mm.

The shaft pivot point 134 may be equidistant between the end barrier 108 and the shaft distal end 122, or the shaft pivot point 134 may be positioned closer to one of the end barrier 108 or the shaft distal end 122, such as closer to the shaft distal end 122. For example, the shaft pivot point 134 may be offset toward the shaft distal end 122 from the center of gravity of the retention jaw 52. In some embodiments, this offset is greater than 10 mm, 20 mm, 30 mm, 40 mm, or 50 mm. One will appreciate, however, that the offset may be less than 10 mm.

The jaw shaft 118 may have a proximal shaft portion length 156 between the end barrier 108 and the shaft pivot point 134 (FIG. 13) that is between 30 and 120 mm, 50 and 90 mm, or 60 and 80 mm. One will appreciate, however, that the proximal shaft portion length 156 can be shorter than 30 mm or longer than 120 mm. Similarly, the jaw shaft 118 may have a distal shaft portion length 158 between the shaft distal end 122 and the shaft pivot point 134 (FIG. 13) that is between 30 and 120 mm, 50 and 90 mm, or 60 and 80 mm. One will appreciate, however, that the distal shaft portion length 158 can be shorter than 30 mm or longer than 120 mm.

The barrier portion 104 may extend from the end barrier 108 to the shaft pivot point 134 and may have a barrier-portion weight, and a shaft portion or the battery-contact portion 102 may extend from the shaft distal end 122 to the shaft pivot point 134 and may have a shaft-portion weight. The barrier-portion weight may be greater than the shaft-portion weight such that the retention jaw 52 is operable to rest in the battery-release position (or receiving position) 54 with the topmost lip 110 being at a lip level at or below a shaft level at the shaft distal end 122 of the jaw shaft 118 and with the shaft distal end 112 of the jaw shaft 118 being above the surface of the bottom structure 66 and with the topmost lip 110 being in proximity to the bottom structure 66, such as at or below the surface of the bottom structure 66. Alternately, the barrier-portion weight may be equal to, or less than, the battery-contact portion weight and the location of the pivot axle 132 may be such that the barrier portion 104 moves to the battery-release position (or receiving position) when a battery 20 is not contacting the battery-contact portion 102, or the barrier portion 104 may be operably connected to a spring that causes the barrier portion 104 to move to the battery-release position (or receiving position) when a battery 20 is not contacting the battery-contact portion 102.

The end barrier 108 of the barrier portion 104 is operable to obstruct a sufficient portion of the battery opening 80 to prevent extraction of the battery 20 when the battery 20 is within the battery compartment 24 and is in contact with the battery-contact portion 102 of the retention jaw 52 such that the weight of the battery 20 forces the battery-contact portion 102 toward the bottom structure 66 causing the end barrier 108 to increase its height with respect to the bottom structure 66.

Moreover, the barrier-portion weight may be less than the battery weight such that the battery-contact portion 102 is operable to descend to the surface of the bottom structure 66 in response to the battery 20 being placed completely within the battery compartment 24 and lowered to the surface of the bottom structure 66 and such that the barrier portion 104 is operable to rise to the battery-retention position (securing position) 106 above the surface of the bottom structure 66 in response to the battery 20 being placed completely within the battery compartment 24 and lowered to the surface of the bottom structure 66 and thereby operable to prevent the battery 20 from exiting the battery compartment 24 along the surface of the bottom structure 66 when the barrier portion 104 is in the battery-retention position (securing position) 106.

With reference to FIG. 12, the hinge plate 92 may be attached (such as by welding) to the bottom structure 66 or the base of the wall 60 in proximity to the battery opening 80. The hinge plate 92 may include one or more axle apertures 136 that can be aligned with an axle hole 138 at the pivot point 134 in the jaw shaft 118. The pivot axle 132 can extend through the axle apertures 136 and the axle hole 138 and be secured by an axle screw 140 to the jaw shaft 118. Axle retention pins 142 may be configured to fit through pin apertures 144 in the hinge plate 92 and align with recesses 146 and hinge plate slots 148 to prevent lateral movement of the pivot axle 132.

The rotation difference between the battery release position 54 and the battery retention position 106 may be a rotation of the pivot axle 132 by as little as 20 degrees, 25 degrees, 30 degrees, or 35 degrees. One will appreciate, however, that the rotation difference may be less than 20 degrees or greater than 35 degrees.

Figure 14:
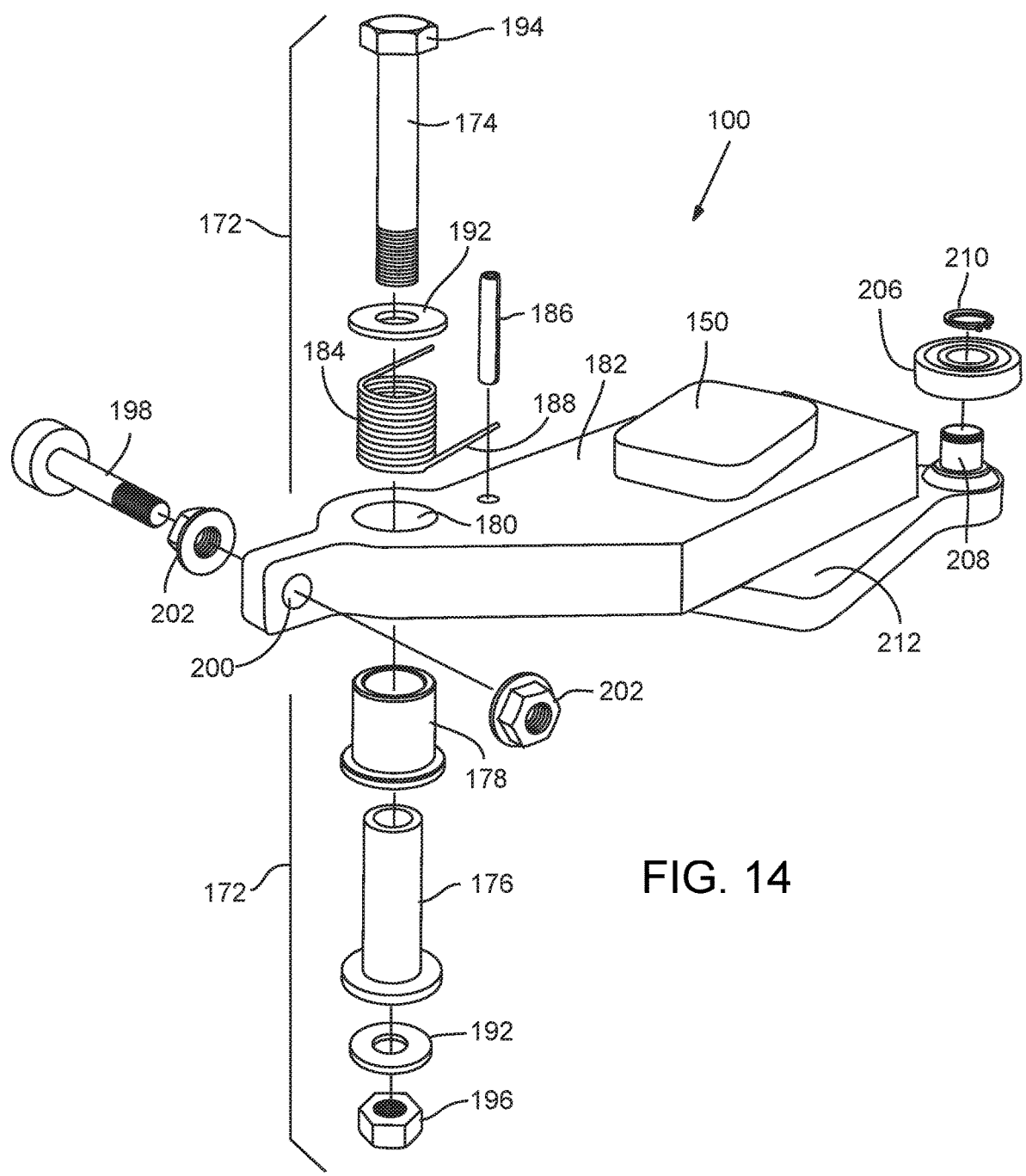
FIG. 14 is an exploded view of a battery-retention mechanism including a stopper block.
Figure 15:
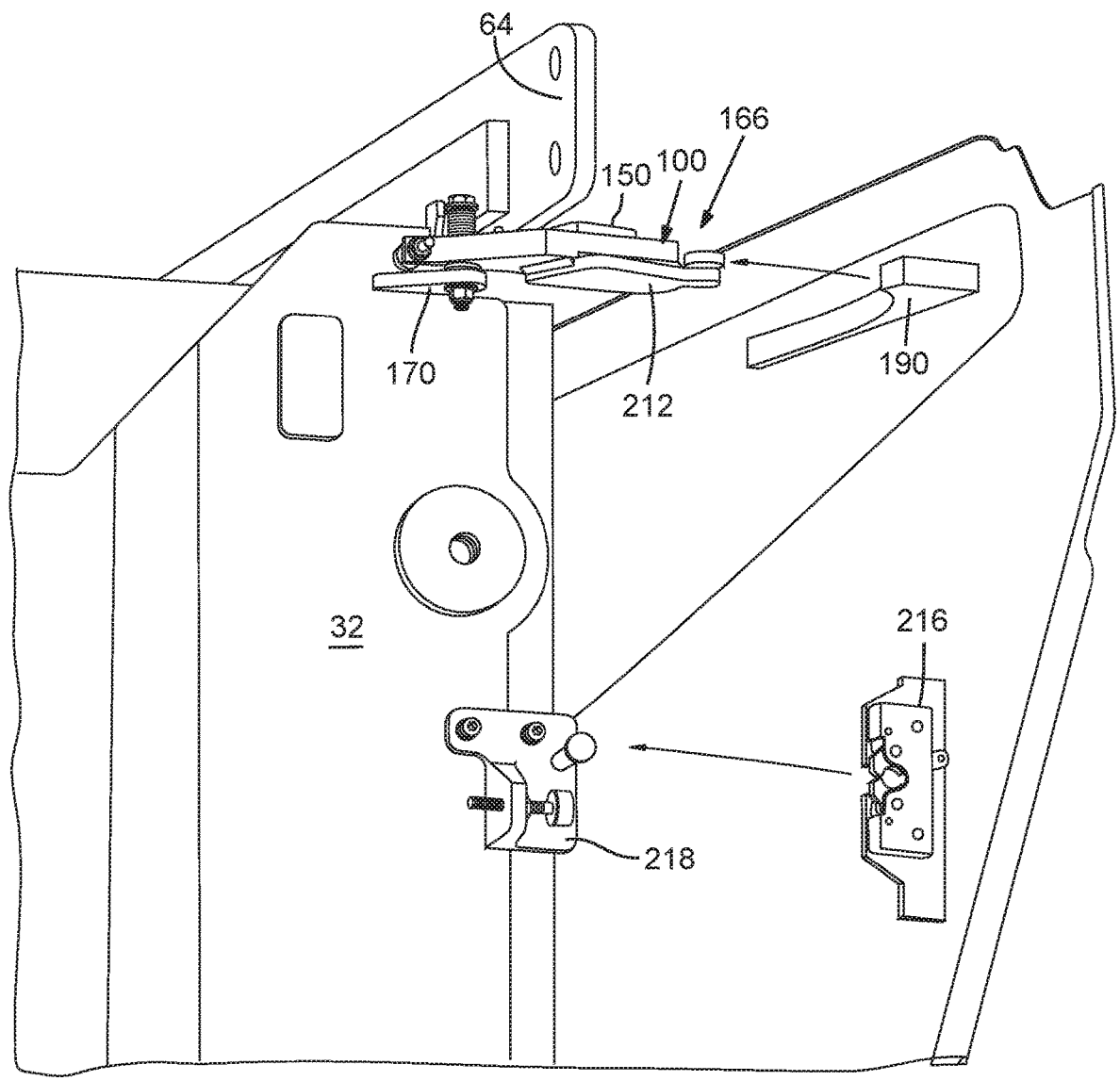
FIG. 15 is a side elevation view showing a battery-retention mechanism associated with a battery compartment with the battery compartment door in a slightly open position.
Figure 18:
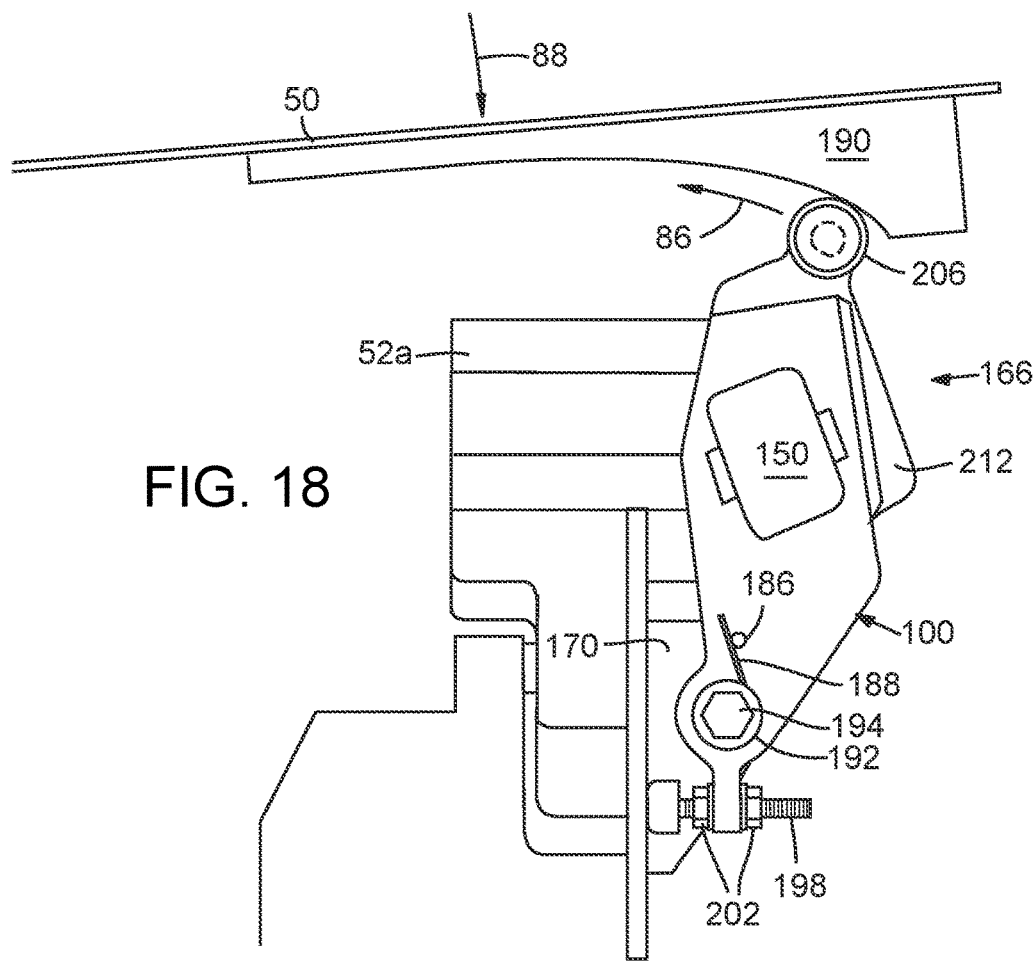
FIG. 18 is a top plan view showing a stopper guide on the battery compartment door engaging the battery-retention mechanism with the battery compartment door in a slightly open position.
Figure 19:
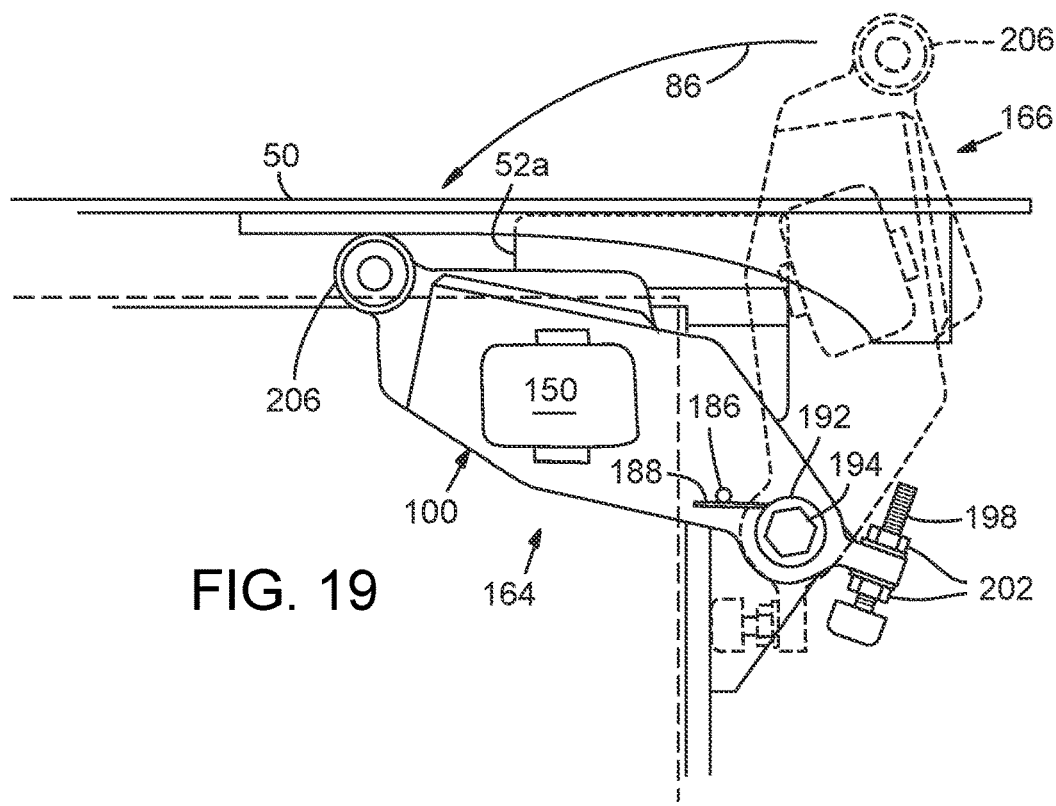
FIG. 19 is a top plan view showing in solid lines a first position of the battery-retention mechanism within the battery compartment with the battery compartment door in a closed position and in broken lines a second position of the battery-retention mechanism external to the battery compartment.
Figure 20:
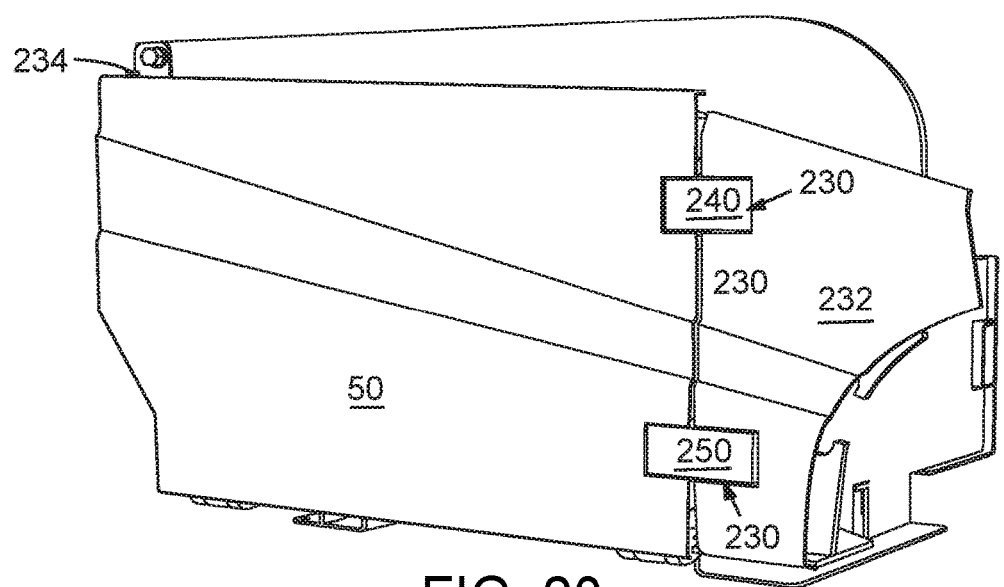
FIG. 20 is a front side perspective view showing retention jaws in a battery-retention position with a closed battery compartment door.

FIG. 14 is an exploded view of the battery-retention mechanism 100 including a stopper block 150; FIG. 15 is a side elevation view showing the battery-retention mechanism 100 with the battery compartment door 50 in a slightly open position 160; FIG. 16 is a top plan view showing an empty battery compartment 24 with the battery compartment door 50 in a fully open position 82; FIG. 17 is a top plan view showing the battery 20 in the battery compartment 24 with the battery compartment door 50 in a closed position 56; FIG. 18 is a top plan view showing a stopper guide 162 on the battery compartment door 50 engaging the battery-retention mechanism 100 with the battery compartment door 50 in a slightly open position 160; FIG. 19 is a top plan view showing in solid lines a blocking position 164b of the battery-retention mechanism 100 within the battery compartment 24 with the battery compartment door 50 in a closed position 56 and in broken lines a nonblocking position 166 of the battery-retention mechanism 100 external to the battery compartment 24; and FIG. 20 is a front side perspective view showing the retention jaws 52 in a battery-retention position 106 with the battery compartment door 50 in a closed position 56.

With reference to FIGS. 14-20, the battery-retention mechanism 100 may be operatively associated with the battery compartment door 24 and may be connected to the frame 32 of the material-handling vehicle 26 in proximity to the battery opening 80 and a side wall 60a or 60b of the battery compartment 24. FIG. 15 shows the frame 32 supporting a connection projection 170 that is configured to support a hinge assembly 172 that connects the connection projection 170 to the battery-retention mechanism 100.

The hinge assembly 172 is operable for rotation of the stopper block 150 into the battery compartment 24 as the battery compartment door 50 achieves the closed position 56 and operable for rotation of the stopper block 150 out of the battery compartment 24 when the battery compartment door 50 achieves a sufficiently open position. The hinge assembly 172 may include a hinge bolt 174 configured to fit within an elongated inner bushing 176. The inner bushing 178 is configured to fit within an outer bushing 178 that is configured to fit within a hinge aperture 180 in a retention plate 182 of the battery-retention mechanism 100. The retention plate 182 may support a spring 184 coiled around the hinge bolt 174 above the hinge aperture 180. A bias pin 186 may be secured to the retention plate 182 in a location to bias an end 188 of the spring 180 to push the battery-retention mechanism 100 toward the nonblocking position 166 when the battery compartment door 50 is in a half open position 84 or a fully open position 82 (or any open position in which an optional stopper guide 190 does not contact the battery-retention mechanism 100, such as in between the half open position 84 and the fully open position 82). One or more washers 192 may separate the spring 184 from the retention plate and/or a bolt head 194. Similarly, one or more washers 194 may separate the inner bushing 178 from a hinge nut 196.

A bias adjustment screw 198 may be extended through an adjustment aperture 200 in the retention plate 182 and connected to the retention plate 182 by one or more lock nuts 202. The position of the lock nuts 202 can be adjusted to determine a bias distance 204 between the adjustment aperture 200 and the side wall 60. The distance 204 determines the biased position of a plate roller 206 of the retention plate 182 particularly with respect to where the plate roller 206 meets the optional stopper guide 190 (and moves the roller plate 206 in a guide-closing direction 86) when the battery compartment door 50 is being closed (in a door-closing direction 88). Alternatively, the plate roller 206 may meet the battery compartment door 50. The plate roller 206 may be supported by a guide post 208 that extends from a post plate 212 that may be connected below the retention plate 182 so that the guide post 208 and plate roller 206 may occupy the same level as the retention plate 182. One will appreciate that the guide post 208 and plate roller 206 may be connected directly to the retention plate 182 and positioned at about the level of the stopper block 150 with the stopper guide 190 being aligned in a corresponding manner. The plate roller 206 may be secured about the guide post 208 by a lock ring 210 or any other suitable conventional fastener.

The retention plate 182 also supports the stopper block 150 that is operable to be positioned within the battery compartment 24 when the battery compartment door 50 is in the closed position 56 and operable to be positioned at least substantially external to the battery compartment 24 and provide substantially unobstructed access to the battery opening 80, the battery receptacle 22, and the battery compartment 24 when the battery compartment door 50 is in an open position, such as the fully open position 82 or the partly open position 84.

In some embodiments, the stopper block 150 is operable to be positioned within the battery compartment 24 when the battery compartment door 50 is engaged with the battery-retention mechanism 100, and the stopper block 150 is operable to be positioned at least substantially external to the battery compartment 24 and to provide substantially unobstructed access to the battery compartment 24 when the battery compartment door 50 is disengaged from the battery-retention mechanism 100.

The stopper block 150 may be positioned within the battery compartment 24 at a stopper block height that is closer to the upper structure 64 than to the bottom structure 66 when the battery compartment door 50 is in the closed position 56. More particularly, when the battery compartment door 50 is in the closed position 56, the stopper block 150 may be aligned underneath the upper structure 64 and positioned between the battery top 36 and the underside surface 70 of the upper structure 64, such that the stopper block 150 is operable to limit movement of the battery 20 in a direction toward the upper structure 64. The stopper block height may be very close to but less than the height or level of the underside surface 70, perhaps almost touching it when the compartment door 50 is in the closed position 56. Thus, the stopper block 150 is operable to limit movement of the battery 20 toward the upper structure 64 to an upper distance limit that is smaller than the barrier height 116.

One will appreciate that the height of the stopper block 150 can be configured to accommodate batteries 20 of different heights. One will also appreciate that the retention mechanism 100 can be implemented with a variety of alternative constructions. For example, the retention plate 182 and the stopper block 150 can be integrated into a single element having the stopper block height for a majority of its surface area. In such embodiment, the spring 184 may sit in a height-recessed region so that it does not reside above the level of the stopper block 150.

Accordingly, when the battery compartment door 50 is in a suitably open position, the stopper block 150 is external to the battery compartment 24 and access to the battery opening 80 is unobstructed, and, additionally, there would be no obstruction between the battery top 36 and the underside surface of the upper structure 64. Thus, the battery 20 could be lifted high enough so that the battery bottom 34 would lose contact with the battery-contact portion 102 of the retention jaw 52, causing the barrier portion 104 to drop to its lowest position, allowing the battery 20 to be removed. The stopper guide 190 is connected to the battery compartment door 50 and is positioned and configured to meet the plate roller 206 and guide the battery-retention mechanism 100 into the battery compartment 24.

Figure 25:
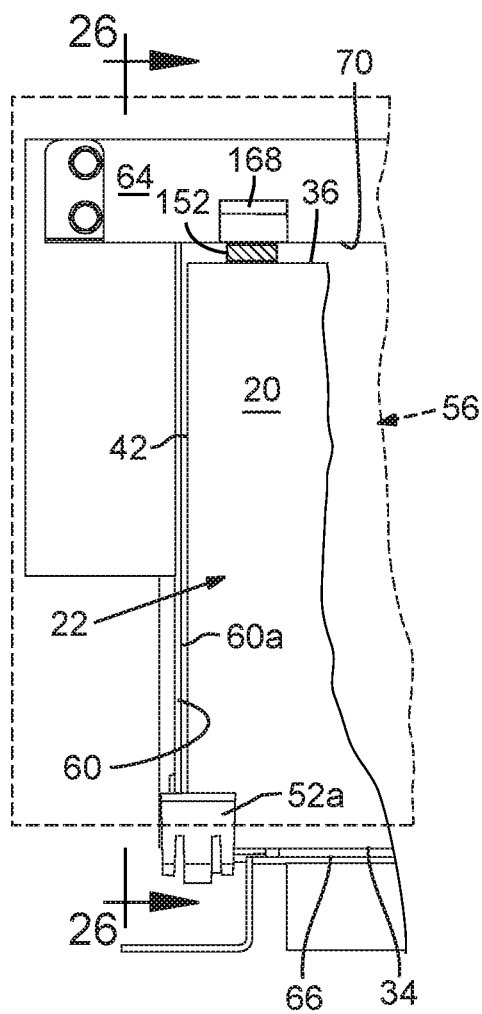
FIG. 25 is a front elevation view showing a door-mounted battery-retention mechanism when the battery compartment door (shown in broken lines) is in a closed position in the presence of a battery.

In some alternative embodiments, the battery-retention mechanism 100 may be connected to an interior side of the battery compartment door 50. FIG. 25 is a front elevation view showing a door-mounted battery-retention mechanism 100 when the battery compartment door 50 (shown in broken lines) is in the closed position 56 in the presence of a battery 20, and FIG. 26 is a side elevation view showing the door-mounted battery-retention mechanism 100 when the battery compartment door 50 is in the closed position in the presence of a battery 20.

Figure 26:
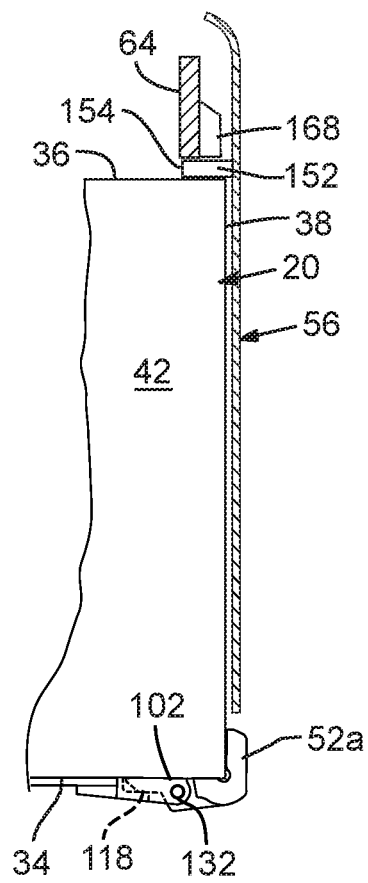
FIG. 26 is a side elevation view showing a door-mounted battery-retention mechanism when the battery compartment door is in a closed position in the presence of a battery.

With reference to FIGS. 25 and 26, a door-mounted retention mechanism 100 may be implemented in variety of ways. For example, the retention mechanism 100 may constitute one or more door projections 152 that function as a stopper block 150 at the stopper block height. Such door projections 152 may be positioned near one or more corners of the battery 20 when it is in the battery compartment 24 when the compartment door 50 is in the closed position 56. Alternatively, such a door projection 152 may constitute a long bar that extends along a majority of the front edge of the battery top 36 when the battery 20 is in the battery compartment 24 and the compartment door 50 is in the closed position 56.

One may appreciate that the side profile of the door projection 152 need not be rectangular. For example, the door projection 152 may have a leading edge that is tapered to facilitate placement between the battery top 36 and the underside surface 70 of the upper structure 64 and prevent damage to the battery 20, the upper structure 64, and the compartment door 50. The door projection 152 could alternatively be retained within a guide that allows the door projection 152 to rise and fall relative to the compartment door 50 so that when closing the compartment door 50, the door projection 152 finds its way into position between the battery top 36 and the underside surface 70 of the upper structure 64. The door projection 152 could also be mounted in a manner that if the battery 20 were to jump up then the door projection 152 could be free to move independent of restriction relative to the compartment door 50. Regardless of which embodiment of the retention mechanism 100 is employed, the upper structure 64 may be reinforced, such as being made thicker or having an additional weld block 168, above the blocking position(s) 164 of the stopper block(s) 150.

Inserting a battery 20 into the battery compartment 24 entails opening the battery compartment door 50 to an open position such that the battery-retention mechanism 100 moves to be in a nonblocking position 166 that is external to the battery compartment 24 and such that the battery opening 80 is unobstructed. The operator of the material-handling vehicle 26 can open the battery compartment door 50, or the operator of the material-handling vehicle 26 can remain seated and another person can open the battery compartment door 50.

A pallet truck or other lift truck can carry a battery 20 to the material-handling vehicle 26 and lift the battery 20 to a battery insertion height such that the battery bottom 34 is above the topmost lip 110 of the barrier portion 104 while the retention jaw 52 is in the battery-release (or battery receiving) position 54 and so that the battery top 36 is lower than the upper structure 64. With the forks lifted so that the battery 20 is at the battery insertion height, the lift truck can carry the battery 20 through the battery opening 80 so that the battery back 40 and the battery front 38 pass into the battery compartment 24 beyond the end barrier 108 of the retention jaws 52 so that the battery 20 is completely within the battery compartment.

The forks can then be lowered so that the battery bottom 34 contacts the ledges 68 of the bottom structure 66 and contacts the battery-contact portion 102 of the retention jaw 52 causing the barrier portion 104 to rise from the battery-release position 54 to the battery-retention position 106 securing the battery 20 within the battery compartment 24. With the battery bottom 34 resting on the bottom structure 66, the battery top 36 is lower than the height of the stopper block 150, which is positioned external to the battery compartment 24. Because the forks of the lift truck are between the ledges 68, the forks can be lowered below the bottom surface 66 so that the forks no longer support the battery 20, and the other lift truck can back away from the battery compartment 24.

The battery compartment door 50 can be moved to the closed position 56 which causes the retention mechanism 100 to move into the blocking position 164 with the stopper block 150 positioned above the battery top 36 and below the underside surface 70 of the upper structure 64. With the stopper block in the blocking position 164, the battery 20 cannot move high enough off of the battery-contact portions 102 of the retention jaws 52 so they must remain in the battery-retention position 106 even if the material-handling vehicle were to flip on its side. The battery compartment door 50 and the frame 32 or side wall 66 have a latching assembly 214 including mated latching fasteners 216 and 218 that keep the battery compartment door 50 secured to the side wall 66, thereby preventing the battery-retention mechanism 100 from springing out of the battery compartment 24.

Removing the battery 20 from the battery compartment 24 entails opening the battery compartment door 50 to an open position such that the battery retention mechanism 100 moves to be in a nonblocking position 166 that is external to the battery compartment 24 and such that the battery opening 80 is unobstructed. The operator of the material-handling vehicle 26 can open the battery compartment door 50, or the operator of the material-handling vehicle 26 can remain seated and another person can open the battery compartment door 50.

With forks of a pallet truck or other lift truck lowered to a level beneath the level of the bottom structure 66, the forks can be positioned beneath the battery 20. Because the retention mechanism 100 is in the nonblocking position 166, the forks can raise the battery 20 to a battery movement height (which may be the same as, or different from, the battery insertion height) such that the battery bottom 34 releases contact with the battery-contact portion 102 of a retention jaw 52 and causes the barrier portion 104 to assume the battery release position (or battery receiving position) 54. At the battery movement height, the battery bottom will be above the level of the topmost lip 110 of the barrier portion 104 and so that the battery top 36 will be lower than the level of the underside surface 70 of the upper structure 64, allowing the battery to be extricated through the battery opening 80 as the forks are moved out through the battery opening 80 while they are supporting the battery 20. With the battery compartment door 50 already open, a new battery 20 can then be inserted as previously described.

The compartment door 50 can be of any conventional design. Other than providing a cosmetic cover to the battery 50 and the battery compartment 24, the compartment door 50 primarily functions to keep the stopper block 150 of the retention mechanism 100 in the blocking position 164 during operation of the material-handling vehicle 26.

As noted earlier, the battery compartment door 50 and the frame 32 or side wall 66 have a latching assembly 214 including mated latching fasteners 216 and 218 that keep the battery compartment door 50 secured to the side wall 66. The latching fasteners 216 and 218 can be of any conventional design such as a rotary latch and striker as shown. In general, the only force acting on the compartment door 50 may be the torsion spring 184 of the retention mechanism 100. The specifications of the latching fasteners 216 and 218 should be capable of handling this force. The latching fasteners 216 and 218 or the compartment door 50 may be equipped with a traction/pump lockout switch that prevents the material-handling vehicle 26 from being operated when the compartment door 50 is not in the closed position 56.

With reference to FIGS. 2, 6, 7, 8, and 15, either one of the mated latching fasteners 216 and 218 may be attached to the battery compartment door 50 and the other of the mated latching fasteners 216 and 218 may be connected to the battery compartment 24 or the frame 32. For example, the fastener 216 is shown connected by a mounting bracket 220 to the frame 32 outside of the battery compartment 24 in FIGS. 2, 6, 7, and 8, but the fastener 216 is shown connected to the battery compartment door 50 in FIG. 15. In one embodiment, the fastener 216 employs a bump stop 222 and a striker 224. The fastener 216 may also employ a latch release 234 that functions through a latch actuator rod 226 connected through a ball joint 228 to permit manual (or automated) unlatching of the compartment door 50 from the frame 32.

In one example, the compartment door 50 may be kept closed by locking it using a rotary latch which has jaws that rotate. The mating part of the rotary latch may be gripped by the latch jaws the striker 224 is closed. The bump stop 222 may prevent the striker 224 from hitting the latch body by limiting insertion of the striker 224 into the latch and may also provide a degree of cushioning the impact. The bump stop 222 may effectively protect the latch from damage from continuous slamming of the compartment door 50 as the striker 224 follows through and contacts the latch body.

The battery compartment door 50 may be connected to the battery compartment 24 or the frame 32 by a door linkage 230 so that the compartment door 50 remains with the material-handling vehicle 26 during the battery exchange process instead of being removable. A permanent linkage may help prevent damage to the compartment door 50 or any nearby panel. The door linkage 230 may be located more toward the front of the material-handling vehicle 26 and be maintained in a closed position via the latching assembly 214 that may be located more toward the rear of the material-handling vehicle 26.

Previous FIGS. 2-4, 6, 7, 16, 17, and 19 show that the compartment door 50 can link through 180° of rotation to the frame 32 or a side front panel 232 connected to the frame 32. One will appreciate that any degree of rotation of the compartment door 50 that is greater than about 90°, the half open position 84, would provide unobstructed access to the battery opening 80. One will also appreciate that some embodiments with less than 90° rotation could be employed depending on the size of the battery 20 with respect to the size of the battery compartment 24 and depending on how far away the hinges are from the battery 20.

Any type of suitable conventional door linkage 230 may be employed to connect the compartment door 50 to the frame 32. Such linkage can be an open chain or closed chain linkage, can be an internal or external linkage, and can be a 4-bar, 3-bar, or single pivot linkage. However, the door linkage 230 is optionally configured not protrude beyond the edge profile of the material-handling vehicle 26, so a more complex hinge than a simple one axis hinge may be employed. For example, a double axis hinge may be used in order to provide clearance between the compartment door 50 and the frame 32 when the compartment door 50 is in a fully open position 82, and such hinge may also allow more protection and cosmetic concealment of the door linkage 230.

Figure 21:
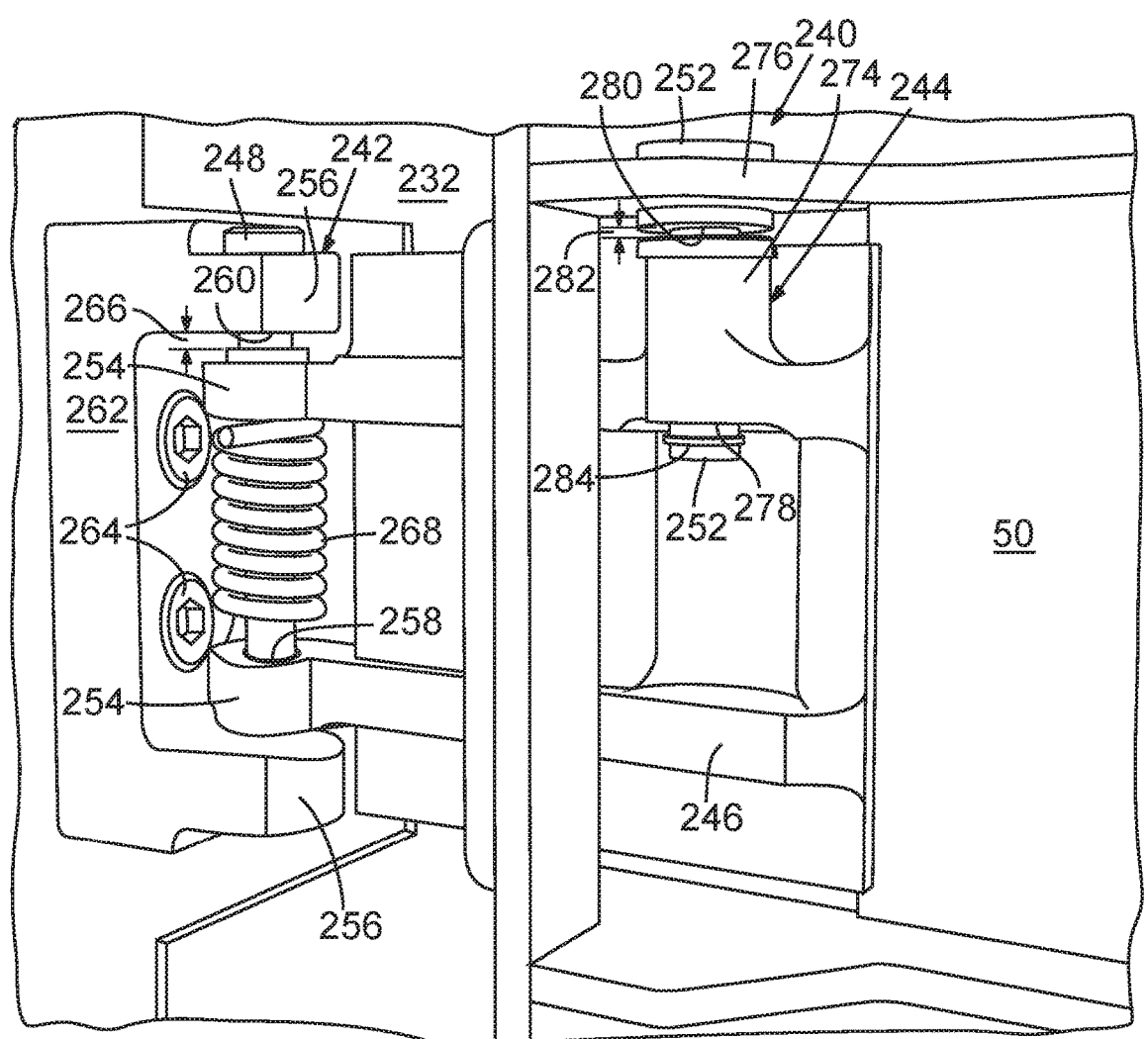
FIG. 21 is a front elevation view showing an upper compartment door hinge when the battery compartment door is in an open position.
Figure 22:
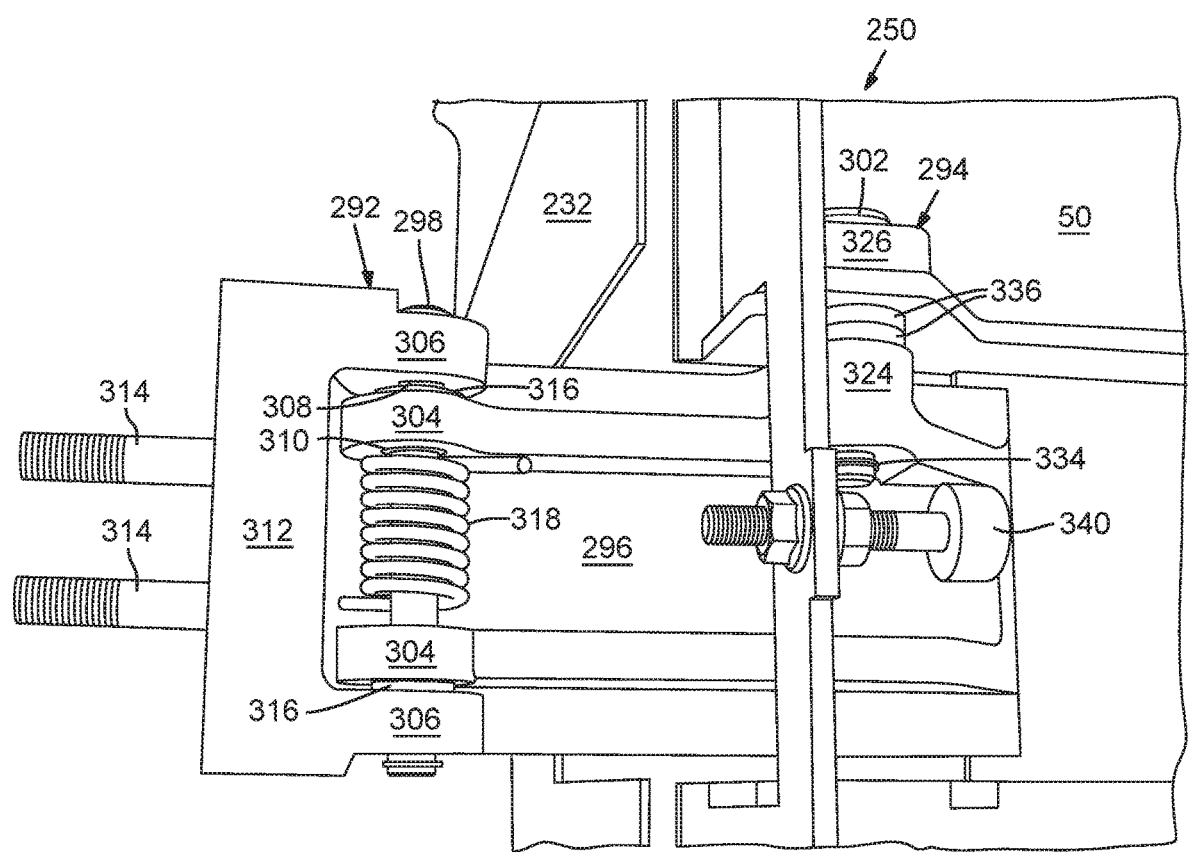
FIG. 22 is an internal front elevation view showing a lower compartment door hinge when the battery compartment door is in an open position.
Figure 23:
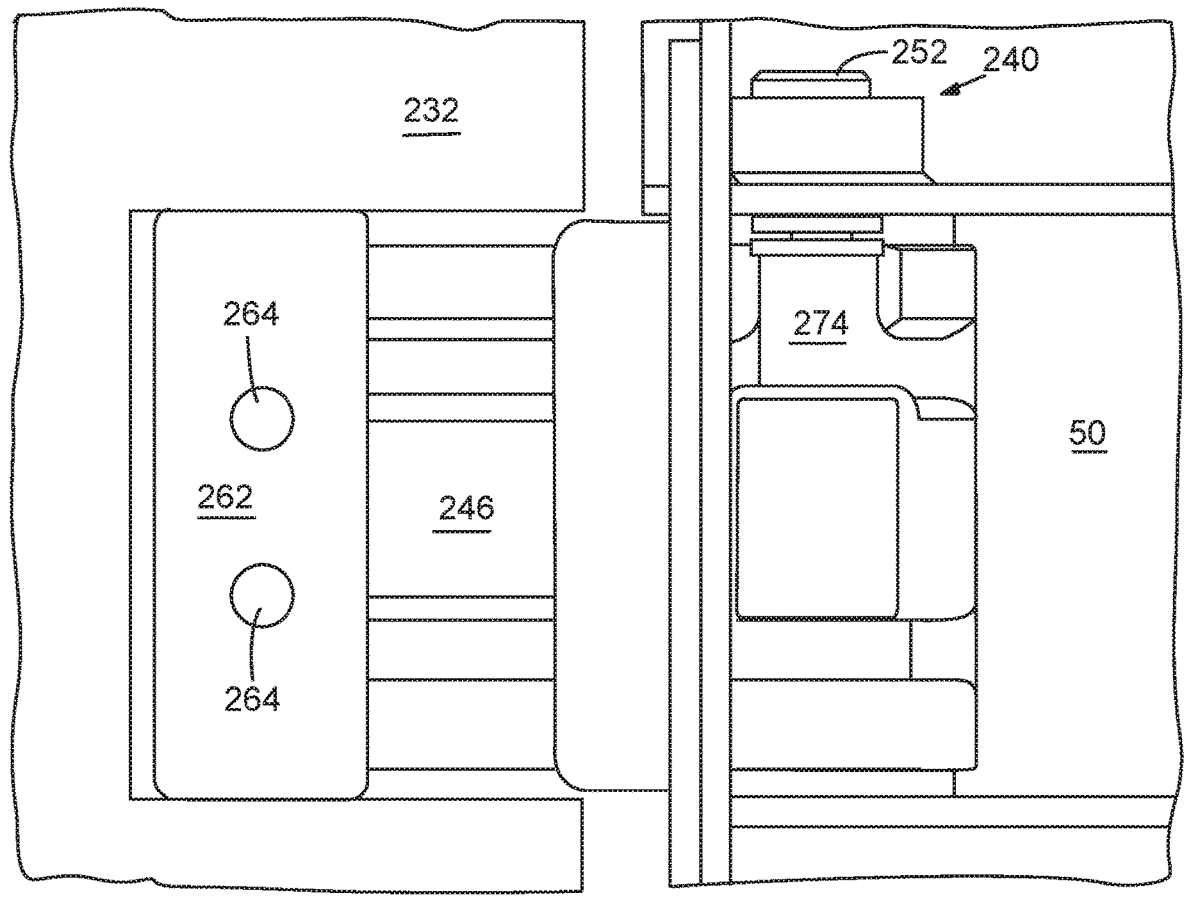
FIG. 23 is an internal front elevation view showing an upper compartment door hinge when the battery compartment door is in a closed position.
Figure 24:
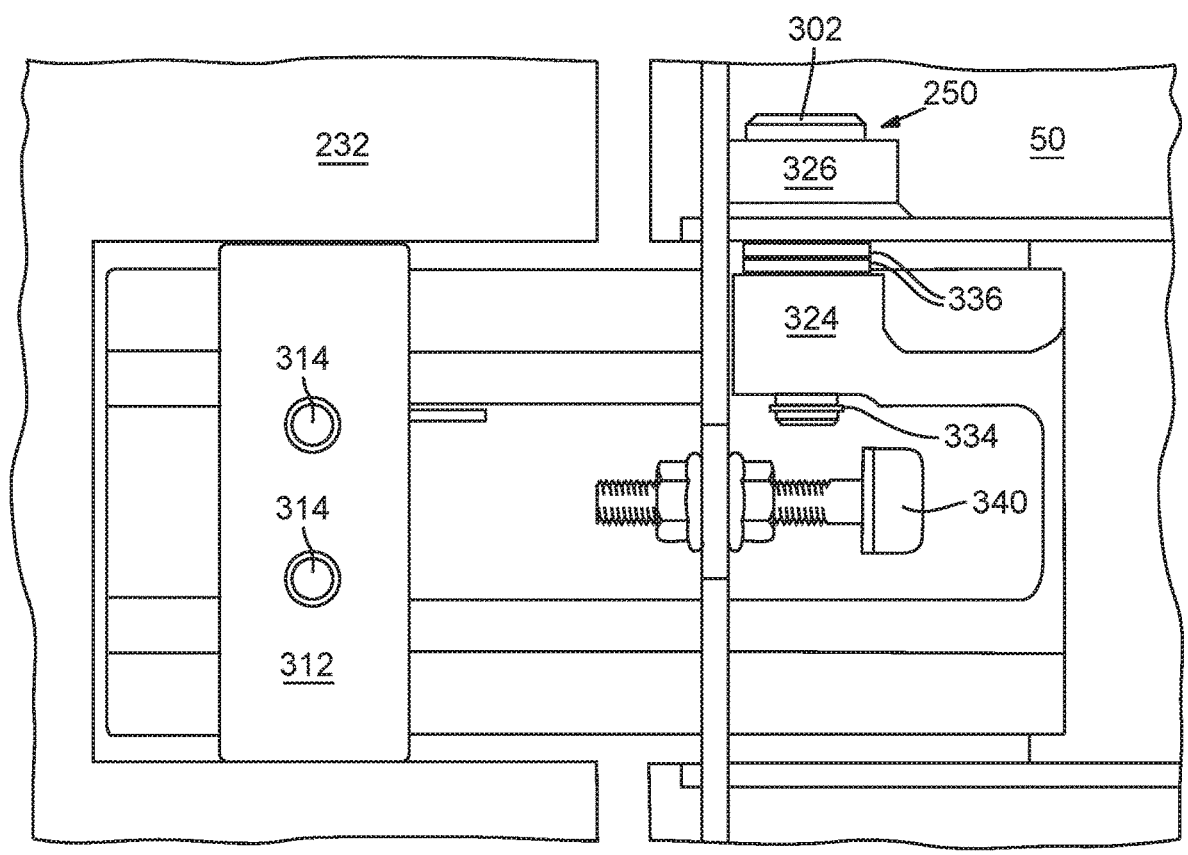
FIG. 24 is an internal front elevation view showing a lower compartment door hinge when the battery compartment door is in a closed position.

FIG. 21 is a front elevation view showing an upper compartment door hinge assembly 240 when the battery compartment door 50 is in the half open position 84; FIG. 22 is an internal front elevation view showing a lower compartment door hinge assembly 250 when the battery compartment door 50 is in the half open position 84; FIG. 23 is an internal front elevation view showing the upper compartment door hinge assembly 240 when the battery compartment door 50 is in the closed position 56; FIG. 24 is an internal front elevation view showing the lower compartment door hinge assembly 250 when the battery compartment door 50 is in the closed position 56.

FIGS. 21-24 show different embodiments of door linkages 230, such as the double-axis hinge assemblies 240 and 250 that allow the compartment door 50 to phase in a distinct order during opening and closing to avoid jamming on parts of the material-handling vehicle 26. In these examples, door phasing can be achieved in part by using torsion springs on one axis and using manual effort applied to the other axis both in the opening and closing directions. In some embodiments, the full weight of the compartment door 50 may be loaded on the lower hinge assembly 250, while the upper hinge assembly 240 may be employed for maintaining alignment and support.

The upper door assembly 240 may employ an upper vehicle-proximal hinge 242 and an upper door-proximal hinge 244 that are connected by an upper hinge link 246 employing an upper vehicle-proximal hinge pin 248 and an upper door-proximal hinge pin 252. The upper vehicle-proximal hinge 242 may include one or more vehicle-proximal linkage brackets 254 and one or more vehicle-proximal brackets 256 having respective bracket apertures 258 and 260 that are configured to receive the upper vehicle-proximal hinge pin 248. The vehicle-proximal brackets 256 may form part of a mounting plate 262 that may be connected to the frame 32 of the material-handling vehicle 26 by mounting screws 264 or other fasteners. The upper vehicle-proximal hinge 242 may be configured to include a tolerance gap 266 and support a torsion spring 268 to bias the compartment door 50 to an open position.

The upper door-proximal hinge 244 may include one or more door-proximal linkage brackets 274 and one or more door-proximal brackets 276 having respective bracket apertures 278 and 280 that are configured to receive the upper door-proximal hinge pin 252, which may be secured by a snap ring 284. The upper door-proximal hinge 244 may be configured to include a tolerance gap 282, which may be the same or different distance as the tolerance gap 266.

The lower door assembly 250 may employ a lower vehicle-proximal hinge 292 and a lower door-proximal hinge 294 that are connected by a lower hinge link 296 employing a lower vehicle-proximal hinge pin 298 and a lower door-proximal hinge pin 302. The lower vehicle-proximal hinge 292 may include one or more vehicle-proximal linkage brackets 304 and one or more vehicle-proximal brackets 306 having respective bracket apertures 308 and 310 that are configured to receive the lower vehicle-proximal hinge pin 298.

The vehicle-proximal brackets 306 may form part of a mounting structure 312 that may be connected to the frame 32 of the material-handling vehicle 26 by mounting hardware 314 that may employ screws, bolts, or other fasteners. The lower vehicle-proximal hinge 292 may be configured to include one or more Oilite or other bearings 316 and support a torsion spring 318 to bias the compartment door 50 to an open position. The torsion spring 318 may have the same or different characteristics as those of the torsion spring 268.

The lower door-proximal hinge 294 may include one or more door-proximal linkage brackets 324 and one or more door-proximal brackets 326 having respective bracket apertures 328 and 330 that are configured to receive the lower door-proximal hinge pin 302, which may be secured by a snap ring 334. The upper vehicle-proximal hinge 242 may be configured to include one or more Oilite bearings 336, which may be the same or different as the Oilite bearings 316. The lower hinge assembly 250 may also include a bump stop 340.

CONCLUSION

The terms and descriptions used above are set forth by way of illustration and example only and are not meant as limitations. Those skilled in the art will recognize that many variations, enhancements and modifications of the concepts described herein are possible without departing from the underlying principles of the invention. For example, skilled persons will appreciate that the subject matter of any sentence or paragraph can be combined with subject matter of some or all of the other sentences or paragraphs, except where such combinations are mutually exclusive. The scope of the invention should therefore be determined only by the following claims, claims presented in a continuation patent application, and equivalents to the foregoing claims.

The invention claimed is:

1. A system for retaining a battery in a battery compartment of a material-handling vehicle, wherein the battery compartment includes a plurality of side walls, an upper structure, and a bottom structure configured to receive a battery, wherein a battery receptacle spans between the side walls, the bottom structure, and the upper structure, and wherein the battery receptacle includes a battery opening sized to allow a battery to pass through the battery opening, the system comprising:

a retention jaw positioned in proximity to the battery opening, wherein the retention jaw includes a battery-contact portion operatively associated with a barrier portion, wherein the barrier portion is movable between a battery-retention position and a battery-release position such that battery contact with the battery-contact portion causes the barrier portion to assume the battery-retention position and such that absence of battery contact with the battery-contact portion causes the barrier portion to assume the battery-release position, wherein the retention jaw is configured such that placement of the battery into the battery compartment causes the battery contact with the battery-contact portion that causes the barrier portion to assume the battery-retention position;

a battery compartment door operable to provide an open position in which the battery opening is unobstructed and operable to provide a closed position in which the battery opening is obstructed; and a battery-retention mechanism operatively associated with the battery compartment door, the battery-retention mechanism comprising a stopper block that is operable to be positioned within the battery compartment at a stopper block height that is closer to the upper structure than to the bottom structure when the battery compartment door is in the closed position such that the stopper block is operable to limit upward movement of a battery enclosed within the battery compartment, wherein the stopper block is operable to be positioned at least substantially external to the battery compartment and to provide substantially unobstructed access to the battery compartment when the battery compartment door is in the open position, and wherein the battery-retention mechanism and the battery compartment door are configured such that closure of the battery compartment door causes the stopper block to be positioned within the battery compartment.

2. The system of claim 1, wherein the bottom structure comprises one or more brackets or ledges.

3. The system of claim 1, wherein the barrier portion is operable to obstruct a sufficient portion of the battery opening to prevent extraction of the battery when the battery is within the battery compartment and the battery is in contact with the battery-contact portion of the retention jaw.

4. The system of claim 1, wherein the retention jaw includes a jaw pivotal-connection mechanism in proximity to the battery opening and the bottom structure.

5. The system of claim 1, wherein the retention jaw comprises a jaw hinge.

6. The system of claim 1, wherein the retention jaw employs a jaw pivotal-connection mechanism including a jaw hinge pin configured to fit through a jaw pivot hole in a jaw shaft at a jaw pivot point between the barrier portion and the battery connection portion, wherein the jaw shaft is indirectly connected to the battery compartment.

7. The system of claim 6, wherein a jaw hinge plate is connected to the bottom structure or a side wall and in proximity to the battery opening, and wherein the jaw hinge plate includes one or more jaw hinge plate holes configured to receive the jaw hinge pin.

8. The system of claim 1, wherein the retention jaw has a shape substantially like an "L".

9. The system of claim 1, wherein the barrier portion and the contact portion form relatively transverse planes.

10. The system of claim 1, wherein the barrier portion weighs more than the battery-contact portion.

11. The system of claim 10, wherein the barrier portion includes an end barrier, wherein the battery-contact portion includes a shaft having a shaft distal end that is located further from the barrier portion than a shaft proximal end, wherein the shaft includes a shaft pivot point positioned between the shaft distal end and the shaft proximal end, wherein the barrier portion extends from the end barrier to the shaft pivot point, and wherein the battery-contact portion extends from the shaft distal end to the shaft pivot point.

12. The system of claim 1, wherein the barrier portion includes a topmost lip; and the retention jaw is constructed such that when the battery compartment is empty, the retention jaw is operable to rest in the receiving position such that the topmost lip is at a lip level that is at or below a contact portion level of the battery-contact portion and such that the battery-contact portion is above the bottom structure.

13. The system of claim 1, wherein the battery-retention mechanism is configured to maintain connection to the battery compartment door during insertion of a battery into the battery compartment and during extraction of a battery from the battery compartment.

14. The system of claim 1, wherein the battery-retention mechanism is configured to maintain connection to the battery compartment during insertion of a battery into the battery compartment and during extraction of a battery from the battery compartment.

15. The system of claim 14, wherein the battery compartment door comprises a stopper guide operable to guide the stopper block into the battery compartment.

16. The system of claim 1, wherein the stopper block is operable to be positioned within the battery compartment when the battery compartment door is engaged with the battery-retention mechanism, and wherein the stopper block is operable to be positioned at least substantially external to the battery compartment and provide substantially unobstructed access to the battery compartment when the battery compartment door is disengaged from the battery-retention mechanism.

17. The system of claim 1, wherein the stopper block is operable to be positioned within the battery compartment at a stopper block height that is closer to the upper structure than to the bottom structure when the battery compartment door is in the closed position.

18. The system of claim 1, wherein the battery compartment door has a door interior side that is operable to be adjacent to the battery opening, and wherein the battery-retention mechanism is connected to the door interior side at a stopper block height that is closer to the upper structure than to the bottom structure when the battery compartment door is in the closed position.

19. The system of claim 1, wherein the barrier portion includes a topmost lip and a barrier base, wherein the topmost lip has a lip height with respect to the barrier base, wherein the stopper block is operable to limit movement of the battery toward the upper structure to an upper distance limit that is smaller than the lip height.

20. The system of claim 1, wherein the battery-retention mechanism employs a stopper block hinge that is operable for rotation of the stopper block into the battery compartment as the battery compartment door achieves the closed position, and wherein the stopper block hinge is operable for rotation of the stopper block out of the battery compartment when the battery compartment door is in the open position.

21. The system of claim 1, wherein the battery has a battery weight and a battery height with respect to a bottom structure surface of the bottom structure, wherein the battery compartment has a compartment height between the bottom structure and the upper structure, wherein the battery-release position is operable to permit the battery to be inserted through the battery opening into the battery compartment between the bottom structure and the upper structure, wherein the battery-contact portion is within the battery compartment and is above the bottom structure surface at a contact height in the battery-release position, wherein the contact height is less than the difference between the compartment height and the battery height with respect to the bottom structure surface, and the retention jaw is configured such that the battery-contact portion is operable to descend to the bottom structure surface in response to the battery being placed completely within the battery compartment and lowered to the bottom structure surface and such that the barrier portion is operable to rise to a securing position above the bottom structure surface in response to the battery being placed completely within the battery compartment and lowered to the bottom structure surface and operable to prevent the battery from exiting the battery compartment along the bottom structure surface when the barrier portion is in the securing position.

22. A system for retaining a battery in a battery compartment of a material-handling vehicle, wherein the battery compartment includes a plurality of side walls, an upper structure, and a bottom structure configured to receive a battery, wherein the side walls include first and second side walls, wherein a battery receptacle spans between the side walls, the bottom structure, and the upper structure, and wherein the battery receptacle includes a battery opening sized to allow a battery to pass through the battery opening, the system comprising:
 a retention jaw positioned in proximity to the battery opening, wherein the retention jaw includes a battery-contact portion operatively associated with a barrier portion, wherein the barrier portion is movable between a battery-retention position and a battery-release position such that battery contact with the battery-contact portion causes the barrier portion to assume the battery-retention position and such that absence of battery contact with the battery-contact portion causes the barrier portion to assume the battery-release position, and wherein the retention jaw is a first retention jaw and is positioned in proximity to the first side wall;

a second retention jaw positioned in proximity to the second side wall and the battery opening, wherein the second retention jaw includes a battery-contact portion operatively associated with a barrier portion, wherein the barrier portion is movable between a battery-retention position and a battery-release position, wherein the barrier portion is at the battery-retention position when a battery contacts the battery-contact portion, and wherein the barrier portion is at the battery-release position when a battery does not contact the battery-contact portion;

a battery compartment door operable to provide an open position in which the battery opening is unobstructed and operable to provide a closed position in which the battery opening is obstructed; and a battery-retention mechanism operatively associated with the battery compartment door, the battery-retention mechanism comprising a stopper block that is operable to be positioned within the battery compartment at a stopper block height that is closer to the upper structure than to the bottom structure when the battery compartment door is in the closed position such that the stopper block is operable to limit upward movement of a battery enclosed within the battery compartment, wherein the stopper block is operable to be positioned at least substantially external to the battery compartment and to provide substantially unobstructed access to the battery compartment when the battery compartment door is in the open position, and wherein the battery-retention mechanism and the battery compartment door are configured such that closure of the battery compartment door causes the stopper block to be positioned within the battery compartment.

23. A method for retaining a battery in a material-handling vehicle, wherein the battery has a battery weight, a battery height from a battery base to a battery top, a battery width between first and second battery sides, and a battery depth between a battery front and a battery back, wherein the material-handling vehicle has a battery compartment with a battery compartment door, wherein the battery compartment includes first and second side retainers, an upper structure, and a battery-receiving surface, wherein the battery compartment includes a receptacle that spans between the first and second side retainers and between the battery-receiving surface and the upper structure, wherein the battery compartment has a compartment height between the battery-receiving surface and the upper structure, wherein the battery compartment has a compartment width between the first and second side retainers, the method comprising:

causing a battery-retention mechanism comprising a stopper block to move the stopper block from within the battery compartment to a position that is at least substantially external to the battery compartment thus providing substantially unobstructed access to the battery compartment by opening the battery compartment door to an open position;

inserting the battery into the receptacle so that the front and back of the battery are completely within the battery compartment;

lowering the battery within the battery compartment, thereby causing a barrier portion of a retention jaw to move to a battery-retention position by engaging the battery with a battery-contact portion of the retention jaw wherein the battery-contact portion is operatively associated with the barrier portion; and causing the battery-retention mechanism to position the stopper block in the battery compartment at a stopper block height that is closer to the upper structure than to the battery-receiving surface by closing the battery compartment door to a closed position such that the stopper block is operable to limit upward movement of a battery enclosed within the battery compartment.

24. A material-handling vehicle, comprising:

a frame;

a drive wheel connected to the frame;

a seat;

a battery compartment supported by the frame, wherein the battery compartment includes a plurality of side walls, an upper structure, and a bottom structure configured to receive a battery, wherein a battery receptacle spans between the side walls, the bottom structure, and the upper structure, wherein the battery receptacle includes a battery opening sized to allow a battery to pass through the battery opening, and wherein the battery compartment is located at least partly under the seat;

a retention jaw positioned in proximity to the battery opening, wherein the retention jaw includes a battery-contact portion operatively associated with a barrier portion, wherein the barrier portion is movable between a battery-retention position and a battery-release position, wherein the retention jaw is configured to maintain continuous engagement with the battery compartment when the retention jaw is in the battery-retention position and when the retention jaw is in the battery-release position such that the retention jaw is configured to move automatically between the battery-retention position and the battery-release position for extraction of the battery from the battery compartment and such that the retention jaw is configured to move automatically between the battery-release position and the battery-retention position for retaining the battery within the battery compartment;

a battery compartment door operable to provide an open position in which the battery opening is unobstructed and operable to provide a closed position in which the battery opening is obstructed; and a battery-retention mechanism operatively associated with the battery compartment door, the battery-retention mechanism comprising a stopper block that is operable to be positioned within the battery compartment at a stopper block height that is closer to the upper structure than to the bottom structure when the battery compartment door is in the closed position such that the stopper block is operable to limit upward movement of a battery enclosed within the battery compartment, wherein the stopper block is operable to be positioned at least substantially external to the battery compartment and provide substantially unobstructed access to the battery compartment when the battery compartment door is in the open position, and wherein the battery-retention mechanism and the battery compartment door are configured such that closure of the battery compartment door causes the stopper block to be positioned within the battery compartment, and wherein the battery-retention mechanism is configured to maintain its continuous engagement with the material-handling vehicle during insertion of a battery in the battery compartment and during extraction of a battery from the battery compartment.

25. The system of claim 1, wherein the battery-retention mechanism is configured to maintain its continuous engagement with the material-handling vehicle during insertion of a battery into the battery compartment and during extraction of a battery from the battery compartment.

26. The system of claim 1, wherein the retention jaw is configured to maintain continuous engagement with the battery compartment when the retention jaw is in the battery-release position.

27. The system of claim 1, wherein the battery-retention mechanism and the retention jaw are discrete unconnected devices.

28. The method of claim 23, wherein the battery-retention mechanism is configured to maintain its continuous engagement with the material-handling vehicle during insertion of a battery into the battery compartment and during extraction of a battery from the battery compartment.

29. The method of claim 28, wherein the retention jaw is configured to maintain its continuous engagement with the material-handling vehicle during insertion of a battery in the battery compartment and during extraction of a battery from the battery compartment.

30. The method of claim 23, wherein the retention jaw is configured to maintain continuous engagement with the battery compartment when the retention jaw is in the battery-release position.

31. The method of claim 23, wherein the battery-retention mechanism and the battery-retention jaw are discrete unconnected devices.

32. The material-handling vehicle of claim 24, wherein the retention jaw is configured to move nonmanually between the battery-retention position and the battery-release position for extraction of the battery from the battery compartment and wherein the retention jaw is configured to move nonmanually between the battery-release position and the battery-retention position for retaining the battery within the battery compartment.

33. The material-handling vehicle of claim 24, wherein the battery-retention mechanism and the battery-retention jaw are discrete unconnected devices.

34. The system of claim 1, wherein the battery compartment door is on one side of the battery compartment and, when closed, constitutes one of the plurality of sides walls of the battery compartment, and wherein the battery compartment door is configured to swing open horizontally about one or more hinges positioned near a vertical edge of a side wall of the battery compartment.

* * * * *

UNITED STATES PATENT AND TRADEMARK OFFICE
CERTIFICATE OF CORRECTION

| | |
|---|---|
| PATENT NO. | : 11,613,182 B2 |
| APPLICATION NO. | : 16/773675 |
| DATED | : March 28, 2023 |
| INVENTOR(S) | : Martin Clark |

It is certified that error appears in the above-identified patent and that said Letters Patent is hereby corrected as shown below:

In the Claims

In Column 28, Claim 24, Line 55, delete "and wherein the" and insert --wherein the-- therefor.

In Column 30, Claim 34, Line 18, delete "sides walls" and insert --side walls-- therefor.

Signed and Sealed this
Twenty-third Day of January, 2024

Katherine Kelly Vidal
*Director of the United States Patent and Trademark Office*